United States Patent
Raveendran et al.

(10) Patent No.: US 11,009,480 B2
(45) Date of Patent: May 18, 2021

(54) LAB ON A CHIP DEVICE FOR MULTI-ANALYTE DETECTION AND A METHOD OF FABRICATION THEREOF

(71) Applicant: AMRITA VISHWA VIDYAPEETHAM, Coimbatore (IN)

(72) Inventors: Jeethu Raveendran, Coimbatore (IN); Vineeth S Raj, Kollam (IN); Aarathi Pradeep, Coimbatore (IN); Suneesh P Vasu, Coimbatore (IN); John Stanley, Coimbatore (IN); Bipin Nair, Kollam (IN); Ramachandran Thiagarajan, Coimbatore (IN); Satheesh Babu G Thekkedath, Coimbatore (IN)

(73) Assignee: AMRITA VISHWA VIDYAPEETHAM, Comibatore (IN)

( * ) Notice: Subject to any disclaimer, the term of this patent is extended or adjusted under 35 U.S.C. 154(b) by 17 days.

(21) Appl. No.: 16/182,913

(22) Filed: Nov. 7, 2018

(65) Prior Publication Data
US 2019/0137437 A1   May 9, 2019

(51) Int. Cl.
*G01N 27/327* (2006.01)
*G01N 27/48* (2006.01)
(Continued)

(52) U.S. Cl.
CPC ....... *G01N 27/3277* (2013.01); *B01F 5/0603* (2013.01); *B01F 13/0064* (2013.01);
(Continued)

(58) Field of Classification Search
CPC ........ G01N 27/327–3272; G01N 2035/00158; B01L 2300/08
See application file for complete search history.

(56) References Cited

U.S. PATENT DOCUMENTS 4,757,022 A * 7/1988 Shults .................. A61B 5/1486
                                            204/403.05
5,770,369 A * 6/1998 Meade .................. B82Y 30/00
                                            435/287.2
(Continued)

OTHER PUBLICATIONS

Cox et al., "A novel, integrated forensic microdevice on a rotation-driven platform: Buccal swab to STR product in less than 2h." Electrophoresis 2016, 37, 3046-3058 (Year: 2016).*
(Continued)

*Primary Examiner* — Alexander S Noguerola
(74) *Attorney, Agent, or Firm* — Convergence Intellectual Property Law P.C.; Jonathan Garfinkel

(57) ABSTRACT

The disclosure provides for a lab-on-a-chip (LOC) device and a method of fabrication thereof. Additionally, a system and a method for point of care testing of multiple biomarkers such as glucose, cholesterol, creatinine, uric acid, and bilirubin is provided. The microfluidic assembly consists of three layers in which the top and the middle layers are made up of polydimethylsiloxane (PDMS) and the bottom layer with polyethylene terephthalate (PET). The device integrates screen printed non-enzymatic electrochemical sensors in the bottom layer for simultaneous detection of glucose, cholesterol, creatinine, uric acid, and bilirubin. A hand held potentiostat with readout enables readout for the point of care application of integrated sensing device. The device developed has potential to revamp healthcare by providing access to affordable technology for better management a diabetes and related complications at every door step.

21 Claims, 22 Drawing Sheets

(51) Int. Cl.
| | |
|---|---|
| *B01F 13/00* | (2006.01) |
| *B01F 5/06* | (2006.01) |
| *B01L 3/00* | (2006.01) |
| *G01N 27/30* | (2006.01) |
| *G01N 35/00* | (2006.01) |

(52) U.S. Cl.
CPC ... *B01L 3/502707* (2013.01); *B01L 3/502715* (2013.01); *G01N 27/308* (2013.01); *G01N 27/48* (2013.01); *B01F 2215/0037* (2013.01); *B01L 3/50273* (2013.01); *B01L 2200/027* (2013.01); *B01L 2200/028* (2013.01); *B01L 2200/12* (2013.01); *B01L 2300/023* (2013.01); *B01L 2300/027* (2013.01); *B01L 2300/0636* (2013.01); *B01L 2300/0645* (2013.01); *B01L 2300/0819* (2013.01); *B01L 2300/0867* (2013.01); *B01L 2300/0883* (2013.01); *B01L 2300/0887* (2013.01); *B01L 2400/0403* (2013.01); *B01L 2400/0487* (2013.01); *G01N 27/3272* (2013.01); *G01N 27/3278* (2013.01); *G01N 2035/00158* (2013.01)

(56) References Cited

U.S. PATENT DOCUMENTS

| | | | | |
|---|---|---|---|---|
| 6,942,771 | B1* | 9/2005 | Kayyem | B01L 3/5027 204/409 |
| 7,089,122 | B2* | 8/2006 | Huang | G01N 27/3273 204/403.02 |
| 8,430,558 | B1* | 4/2013 | Yakhshi Tafti | B01F 5/0603 366/340 |
| 2010/0105577 | A1* | 4/2010 | Dugan | B01L 3/502746 506/39 |

OTHER PUBLICATIONS

Ahm C.H., et al., "Disposable Smart Lab on a Chip for Point-of-Care Clinical Diagnostics," Proceedings of the IEEE, Jan. 2004, vol. 92(1), pp. 154-173.

Cortina M.E., et al., "Electrochemical Magnetic Microbeads-Based Biosensor for Point-of-Care Serodiagnosis of Infectious Diseases," Biosensors and Bioelectronics, Jun. 15, 2016, vol. 80, pp. 24-33.

Dong H., et al., "Screen Printed Microfluidic Device for Electrochemical Immunoassay," Lab on a Chip, 2007, vol. 7 (12), pp. 1752-1758.

Eddings M.A., et al., "Determining the Optimal PDMS-PDMS Bonding Technique for Microfluidic Devices," Journal of Micromechanics and Microengineering, 2008, vol. 18(6), 5 pages.

Li C., et al., "A Novel Lab-on-a-Tube for Multimodality Neuromonitoring of Patients with Traumatic Brain Injury (TBI)," Lab on a Chip, Jul. 2009, vol. 9(14), pp. 1988-1990.

Lillehoj P.B., et al.,"A Self-Pumping Lab-on-a-Chip for Rapid Detection of Botulinum Toxin," Lab on a Chip, Sep. 7, 2010, vol. 10(17), pp. 2265-2270.

Satoh W., et al., "Integrated Electrochemical Analysis System with Microfluidic and Sensing Functions," Sensors (Basel), Feb. 2008, vol. 8(2), pp. 1111-1127.

Yu L., "The Adhesion of Poly(Dimethyl Siloxane) to Silica Substrates," Chemical Engineering, 2014, 53 pages.

* cited by examiner

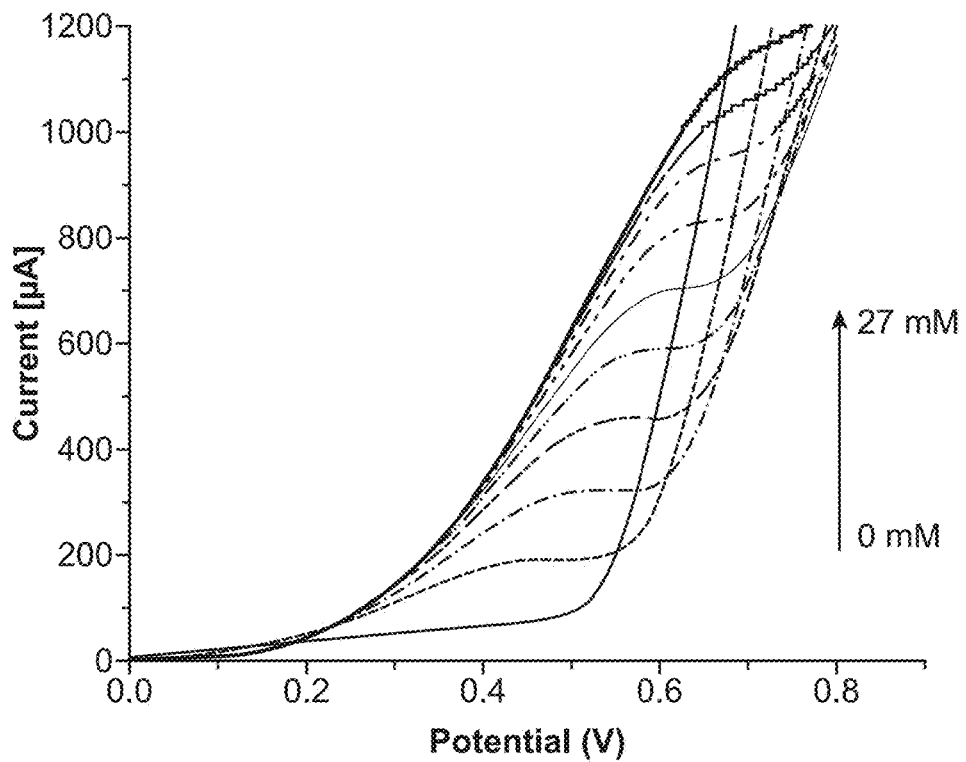
FIG. 18A
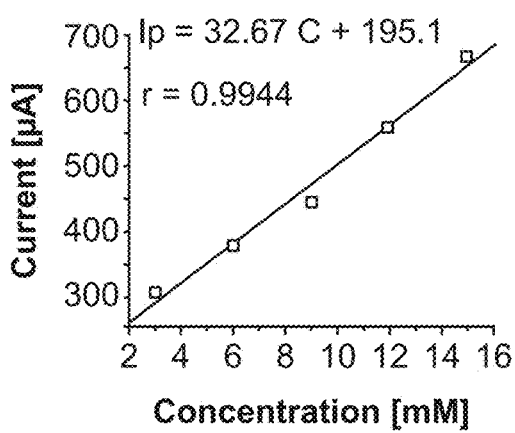 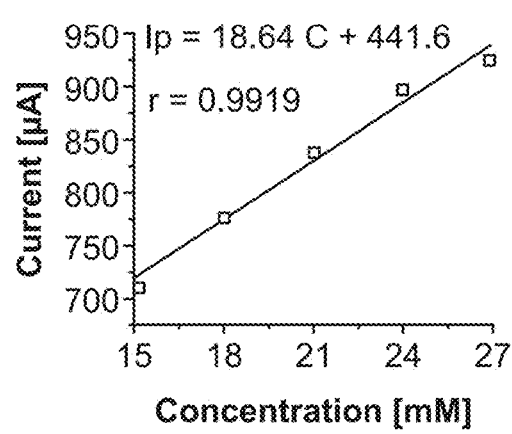
FIG. 18B FIG. 18C

LAB ON A CHIP DEVICE FOR MULTI-ANALYTE DETECTION AND A METHOD OF FABRICATION THEREOF

CROSS-REFERENCES TO RELATED APPLICATIONS

The present application claims priority to Indian Patent Application No. 201741039657 filed on Nov. 7, 2017 entitled "LAB-ON-A-CHIP GLUCOSE SENSOR ARRAY DEVICE WITH INTEGRATED NON-ENZYMATIC SENSORS", and Indian Patent Application No. 201841004049 filed on Feb. 2, 2018 entitled "LAB ON A CHIP DEVICE FOR MULTI-ANALYTE DETECTION AND A METHOD OF FABRICATION THEREOF", both of which are incorporated herein by reference in its entirety.

FIELD OF THE INVENTION

The disclosure relates generally to microfluidic array devices and in particular to a lab on chip device to detect the concentration of one or more analytes.

DESCRIPTION OF RELATED ART

Diabetes mellitus is a chronic disorder associated with wide range of complications such as chronic kidney disorders (CKD), cardiovascular diseases (CVD), diabetic foot, diabetes retinopathy, liver diseases and neuropathy and has become an alarming concern in comities such as India which have a large diabetic population. An affordable and accessible way of diabetes management is self-monitoring of blood glucose (SMBG). But the likelihood of developing arthritis, liver diseases and CKD with the onset of diabetes mellitus emphasize the importance of simultaneous monitoring of multiple biomarkers such as other diabetes markers, oxidative stress markers, cancer markers, hepatic disease markers, cholesterol, uric acid, bilirubin and creatinine (biomarkers for CVD, gout, liver diseases and renal function) in addition to glucose for better non-communicable disease management. Currently, the quantitative determination of these biomarkers involves a tedious and expensive laboratory process.

Lab-on-a-Chip (LOC) systems are an attractive alternative approach which can revolutionize simple point of care (POC) device market dramatically by converging complex laboratory functions into a small chip that is of a few centimeters in size. By incorporating sensors for multiple biomarkers such as glucose, cholesterol, creatinine, uric acid and bilirubin, LOC will revamp healthcare by providing access to affordable technology for better management of diabetes and related complications at every door step. Development of LOCs for clinical analysis is highly challenging, as it requires expertise in diverse areas such as computational fluid dynamics, microfluidics, biosensors and microelectronics. Regardless of their interdisciplinary nature, LOCs have attracted tremendous attention due to the enormous advantages.

Controlled manipulation of fluids in the LOC is important for the mixing between streams, accurate dispensing and adequate coverage of fluid in the reservoirs. LOC systems for controlled manipulation of fluids have been fabricated by integrating multiple layers. Care must be taken during the integration of the different layers and interconnects as they are prone to collapse and leakage. One of the main challenges encountered in LOC devices is the incomplete filling of detection wells leading to poor performance. Adequate surface coverage or proper filling of fluid on the sensor surface is essential to ensure good sensitivity. "A self-pumping lab-on-a-chip for rapid detection of botulinum toxin," Lillehoj et al. (Lab on a Chip. 2010; 10(17):2265-70) discloses a microfluidic device using PEG-treated PDMS for the detection of botulinum toxin. Even after the treatment with PEG, the fluid coverage was not complete on the circular wells. Studies showed that the reservoir filling is strongly affected by surface hydrophilicity and size and shape of the well.

Bonding of PDMS stamp with other substrates or sealing of microfluidic channels is a crucial step in the LOC development. Numerous methods are available for bonding of the PDMS, such as partial curing, surface oxidation with wet chemicals, corona, or plasma treatment, adhesives and adhesive tapes. "Determining the optimal PDMS-PDMS bonding technique for microfluidic devices," Edding et al. (Journal of Micromechanics and Microengineering. 2008; 18(6):067001) studies different PDMS bonding techniques and found that partially cured and uncured. PDMS adhesive techniques show high bond strength than that obtained with oxygen plasma. The fabrication of microfluidic structures by patterned adhesive bonding using PDMS has been attempted. The bonding between polyethylene terepthalate (PET), the common substrate used for the screen printing, and PDMS has also been attempted previously.

Efforts have been put forward to develop microfluidic systems for multiple analyte detection. "Disposable smart lab on a chip for point-of-care clinical diagnostics," Ahn et al. (Proceedings of the IEEE. 2004; 92(1)1154-73) discloses a disposable passive microfluidic system with air burst detonator as on chip power source for the fluid movement. The system was used for the enzymatic electrochemical detection of glucose, lactate and oxygen. The sensors were patterned with microadditive techniques such as deposition and lithography. Similarly, "A novel lab-on-a-tube for multimodality neuromonitoring of patients with traumatic brain injury (TBI)" Li et al. (Lab on a Chip. 2009; 9(14):1988-90) discloses a lab on a tube system which can measure pressure, oxygen, temperature and glucose has been developed for neuromonitoring (Lab on a Chip. 2009; 9(14):1988-90). Paralene material was used for the microchannel fabrication. "Screen-printed microfluidic device for electrochemical immunoassay," Dong et al. (Lab on a Chip. 2007; 7(12) 11752-8) attempts screen printing based fabrication of a microfluidic device capable of simultaneous immunosensing. The device was demonstrated by mouse IgG detection. "Electrochemical magnetic microbeads-based biosensor for point-of-care serodiagnosis of infectious diseases," Cortina et al. (Biosensors and Bioelectronics. 2016, 8:24-33) reports an immunosensor platform for the point of care detection of infectious diseases. Even through the system did not have a microfluidic component; it has used acrylic electrode cartridge and portable potentiostat device. "Integrated Electrochemical Analysis System with Microfluidic and Sensing Functions," Satoh et al (Sensors. 2008; 8(2):1111-27) describes a LOC device for the detection of eight different analyte using the principles of hydrophilicity and electrowetting for the manipulation of fluid. The system uses enzymatic electrochemical sensors for the detection.

Many of the above discussed systems are limited in their detection or design, involve too many steps for fabrications and use too many components for fluid manipulation. More over involvement of biological component in the sensor recognition element, such as enzymes, will increase the cost of the system. The invention discloses simple, global microfluidic platform that avoids fabrication related complications and may fulfil the needs of a large population and research community.

SUMMARY OF THE INVENTION

The invention in various aspects relates to microfluidic array device, such as a lab on a chip device with integrated components, for single- or multi-analyte detection, a method of use thereof and a method of fabrication thereof.

In various embodiments a microfluidic array device for determining the concentration of one or more analytes is disclosed. The device includes a plurality of assembled units, where each unit includes a sample well that is configured to receive a sample, a reagent well configured to receive a reagent, a mixing well that is configured to receive the sample from the sample well and reagent from the reagent well to form a mixture, a meander channel with a plurality of meanders having alternatively varying diameters and configured to receive the mixture from the mixing well and enhance the mixing of the mixture, thereby forming a uniform solution and a sensor chamber that is in fluidic contact with a sensor unit of a plurality of sensor units and configured to receive the uniform solution from the meander channel, wherein each sensor unit generates an output indicative of the one or more analyte concentrations in the sample.

In some embodiments the sensor chambers of the plurality of assembled units are connected to a common outlet that is mounted with a syringe or a pump to supply negative pressure thereon.

In various embodiments of the invention each unit further includes microchannels connecting the reagent well to the corresponding sample well at the inlet of the mixing well configured as a T-inlet.

In one embodiment the device is fabricated in a plurality of layers that include a first layer housing the plurality of assembled units, a third layer having a substrate where the plurality of sensor units are screen printed and a second layer that is sandwiched between the two layers. In some embodiments the second layer includes a plurality of holes to fit the sensor unit, thereby allowing fluidic contact between the sensor unit and the sensor chamber.

In various embodiments the first layer and the second layer are made of polydimethylsiloxane (PDMS). In some embodiments the substrate for the third layer includes any of polyethylene terephthalate, polycarbonate, polyethylene, polypropylene, polyvinyl chloride, polyamide, polymethyl methacrylate, or polysulfone.

In various embodiments, one or more of the sensor unit is a non-enzymatic electrochemical sensor.

In one embodiment the device is configured to determine the concentration of analytes selected from glucose, cholesterol, creatinine, uric acid, and bilirubin.

In various embodiments, one or more of the sensor unit includes a three-electrode system comprising at least one working electrode, a carbon counter electrode, and a reference electrode.

In one embodiment the working electrode is modified with a CuO nanoparticle coating and is configured to determine glucose concentration. In another embodiment the working electrode is an activated screen printed carbon electrode and is configured to determine uric acid concentration. In yet another embodiment the working electrode is a screen printed carbon electrode and is configured to determine creatinine concentration. In some embodiments the working electrode is screen printed carbon electrode printed with copper nanoparticles and is configured to determine bilirubin concentration. In various embodiments the working electrode is a pencil graphite electrode and is configured to determine cholesterol concentration.

In various embodiments the meander channel has alternately varying diameters, a first diameter in the range of 150 to 250 μm and a second diameter in the range of 350 to 450 μm, and a depth in the range of 100 to 120 μm. In various embodiments the generated output is voltages indicative of the analyte concentration in the samples.

In some embodiments the sensor chambers are integrated with a potentiostatic meter module that includes a plurality of analog front ends where each of the analog front end are connected to the corresponding sensor units, a microcontroller connected to each of the analog front ends and configured to interface with the sensor units and convert the outputs into chemical concentrations of the samples and an output unit configured to transmit the chemical concentrations.

In various embodiments the output unit includes a graphical LCD display unit or a Bluetooth enabled device using a Bluetooth module.

In various embodiments a method of determining analyte concentration in a plurality of samples, includes loading a plurality of samples in the array device and assaying the samples to determine analyte concentration in the samples.

This and other aspects are disclosed herein.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 18A illustrates the electrochemical response on ten different electrodes for 3 mM glucose concentration.

FIG. 18B shows tele glucose concentration in five samples.

FIG. 18C shows glucose concentration Vs current plot for five samples.

DETAILED DESCRIPTION OF THE EMBODIMENTS

Figure 1:
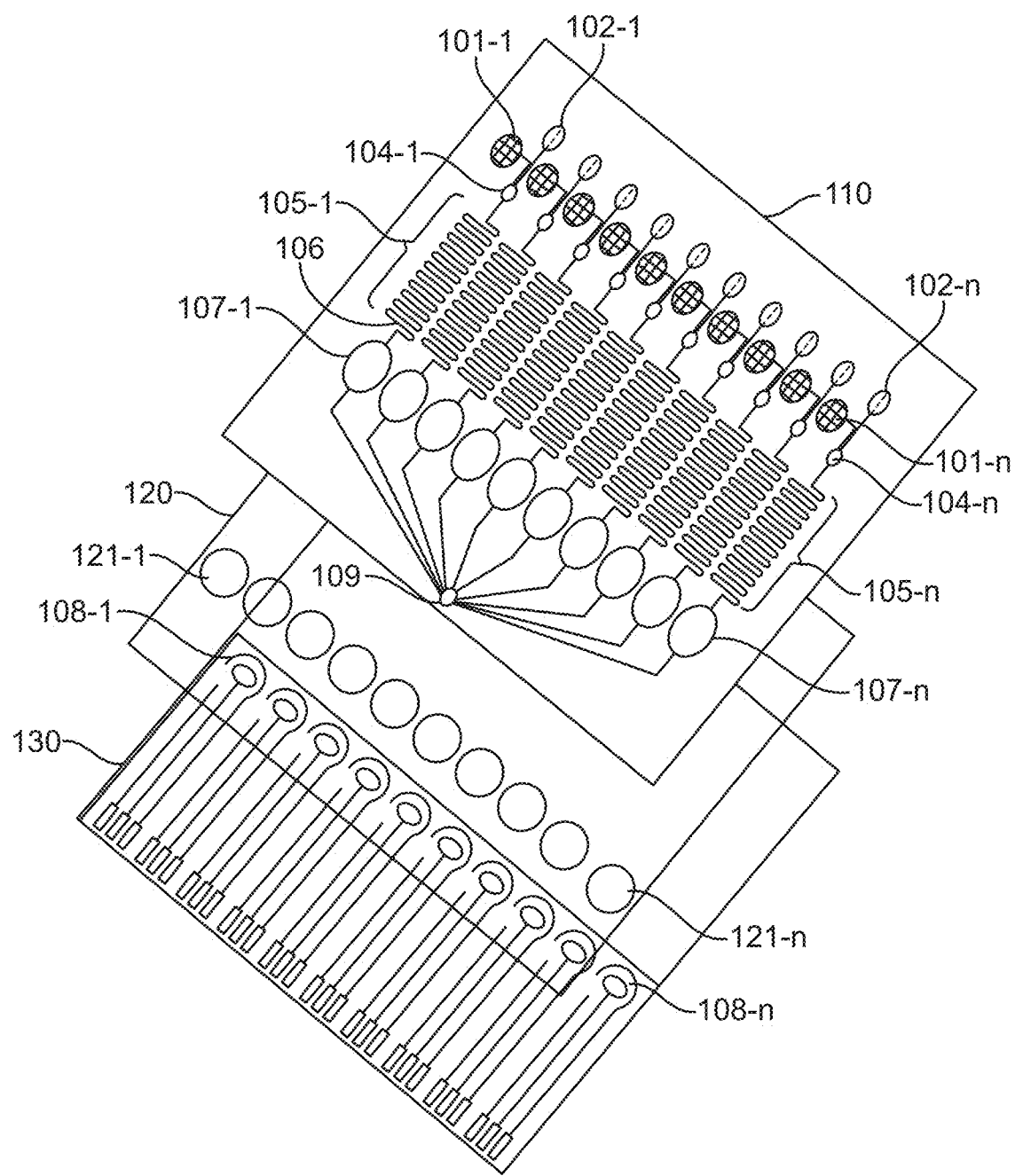
FIG. 1 illustrates a microfluidic array device for simultaneously determining the concentration of analytes in a plurality of samples.

While the invention has been disclosed with reference to certain embodiments, it will be understood by those skilled in the art that various changes may be made and equivalents may be substituted without departing from the scope of the invention. In addition, many modifications may be made to adapt to a particular situation or material to the teachings of the invention without departing from its scope.

Throughout the specification and claims, the following terms take the meanings explicitly associated herein unless the context clearly dictates otherwise. The meaning of "a", "an", and "the" include plural references. The meaning of "in" includes "in" and "on." Referring to the drawings, like numbers indicate like parts throughout the views. Additionally, a reference to the singular includes a reference to the plural unless otherwise stated or inconsistent with the disclosure herein.

The word "exemplary" is used herein to mean "serving as an example, instance, or illustration". Any implementation described herein as "exemplary" is not necessarily to be construed as advantageous over other implementations.

In various embodiments a microfluidic array device is disclosed herein, for the simultaneous determination of multiple analyte concentration a plurality of samples. The components of the device are integrated in a Lab-on-a-chip (LOC) device that integrates the fluidics, electronics and various sensors. The microfluidic array device in various embodiments is capable of simultaneously monitoring multiple biomarkers. In some embodiments, the biomarkers include diabetes markers, oxidative stress markers, cancer markers, hepatic disease markers, CVD, gout, liver diseases and renal function. In some embodiments, the biomarkers include cholesterol, uric acid, bilirubin and creatinine in addition to glucose.

In various embodiments the microfluidic array device 100, as shown in FIG. 1 includes a plurality of assembled units. In one embodiment, provided herein is a plurality of sample wells 101-1, 101-2, . . . 101-n, each sample well 101-1, 101-2 . . . 101-n configured to receive and store a sample from a plurality of subjects. In some embodiments, a plurality of reagent wells 102-1, 102-2, . . . 102-n is provided, each reagent well 102-1, 102- . . . 102-n configured to receive a reagent from a reservoir. In some embodiments, the device 100 includes a plurality of mixing wells 104-1, 104-2 . . . 104-n, each mixing well 104-1, 104-2 . . . 104-n configured to receive the reagent from the corresponding reagent well 102-1, 102-2 . . . 102-n and sample from the corresponding sample well 101-1, 101-2 . . . 101-n and mix the reagent with each sample to form a reagent-sample mixture. In one embodiment, the device 100 includes a plurality of meander channels 105-1, 105-2 . . . 105-n, each meander channels 105-1, 105-2 . . . 105-n configured to receive the reagent-sample mixture from the corresponding mixing well 104-1, 104-2 . . . 104-n. In some embodiments, the meander channels 105-1, 105-2 . . . 105-n are provided with a plurality of meanders 106 to enhance the mixing of an analyte and reagent within the mixtures, thereby forming a uniform solution. In one embodiment, the device 100 includes a plurality of sensor chambers 107-1, 107-2 . . . 107-n connected to the outlet of the meander channels 105-1, 105-2 . . . 105-n each sensor chamber 107-1, 107-2 . . . 107-n configured to receive the uniform solution from the corresponding meander channel 105-1, 105-2 . . . 105-n. Each sensor chamber 107-1, 107-2 . . . 107-n is in fluidic contact with a sensor unit 108. In some embodiments, each sensor unit 108-1, 108-2 . . . 108-n is configured to generate a value corresponding to the analyte concentration for the sample in the sample well 101-1, 101-2 . . . 101-n.

In one embodiment the sensor units 108-1, 108-2 . . . 108-n may be the same and the device is configured to detect the concentration of one particular analyte contained in a plurality of samples. In another embodiment the sensor units 108-1, 108-2 . . . 108-n may be different and the device is configured to simultaneously detect the concentration of different analytes present in the sample of a subject or the device may be configured to simultaneously detect the concentration of different analytes present in the samples of a plurality of subjects.

In one embodiment, the sensor wells 107-1 ... 107-n are connected to a common outlet 109, as shown in FIG. 1, on to which a syringe or pump is mounted to supply the necessary negative pressure for the fluid flow.

In various embodiments the microfluidic array device 100 is fabricated in a plurality of layers 110, 120, 130 as shown in FIG. 1. The plurality of layers include a first layer 110 that houses the plurality of assembled units, a second layer 120 that has number of holes 121-1 ... 121-n as the number of chambers 107-1 ... 107-n in the first layer. The circumference of each hole 121-1 ... 121-n matches the circumference of the sensor chamber 107-1 ... 107-n in the first layer. The device further includes a third layer 130 that has a substrate over which the sensor units are screen printed. The fabrication of the microfluidic array device 100 includes sandwiching the second layer 120 between the first layer 110 and the third layer 130 such that each sensor unit in the third layer fits in the respective hole of the second layer and each hole in the second layer fits the respective sensor chamber in the first layer. This enables fluidic contact between the sensor unit and the sensor chamber. The integrated multilayer fabrication allows for controlled manipulation of fluids by proper filling of fluid in the sensor chamber thereby improving the mixing of the sample and the reagent, accurate dispensing, adequate coverage of fluid in the sensor chamber and avoiding collapse and leakage.

In various embodiments the first layer and the second layer of the microfluidic array device are made of polydimethylsiloxane (PDMS). The substrate for the third layer in various embodiments is chosen from polyethylene terephthalate, polycarbonate, polyethylene, polypropylene, polyvinyl chloride, polyimide, polymethyl methacrylate, and polysulfone.

Figure 2:
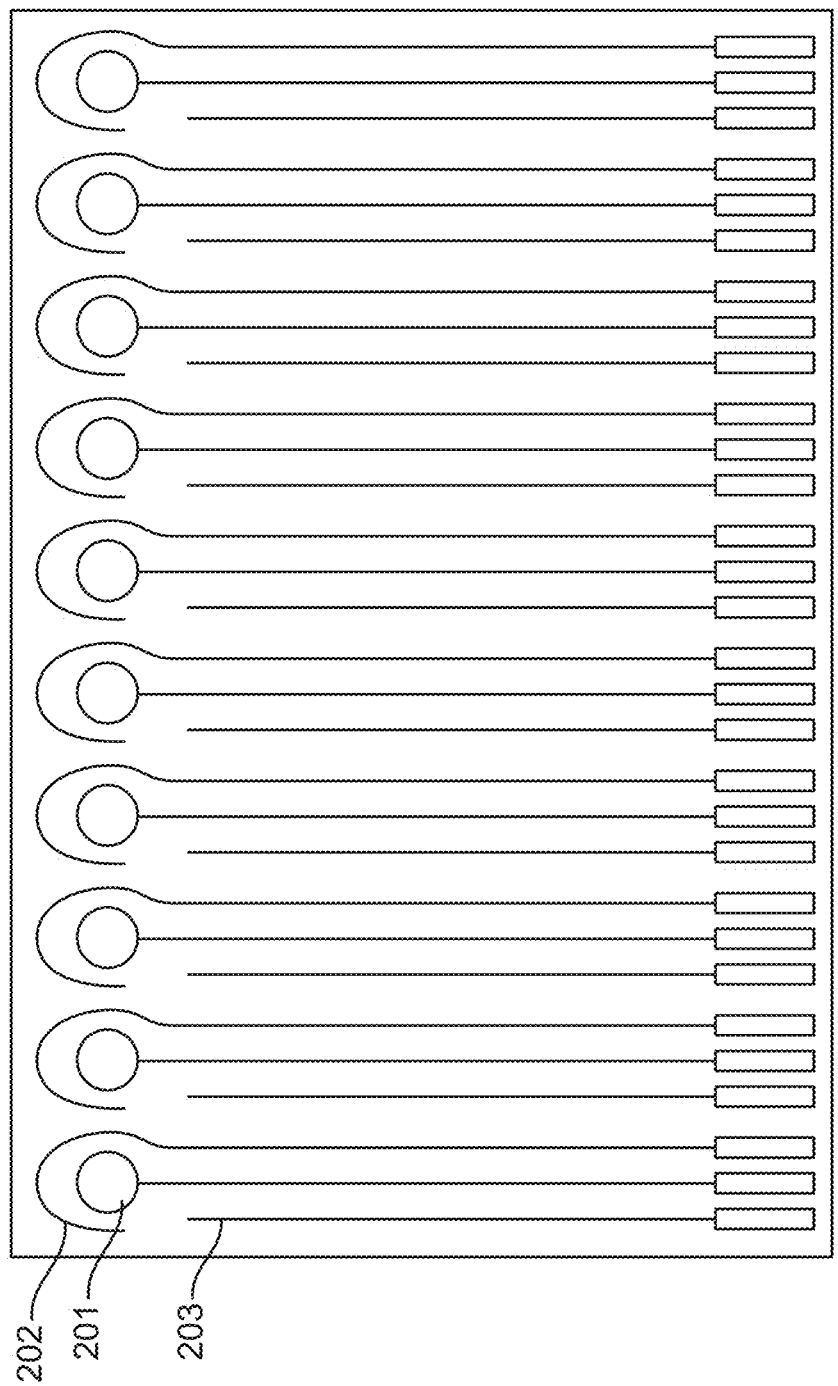
FIG. 2 illustrates the sensor unit having an array of sensors.

In one embodiment of the invention, the sensor units 108-1, ... 108-n is a nonenzymatic electrochemical sensor. The sensor unit is configured to simultaneously determine the concentration of analytes that include glucose, cholesterol, creatinine, uric acid, and bilirubin. One or more biosensors are screen printed over a third layer as shown in FIG. 2. In some embodiments each biosensor 200 is a three electrode system with at least one working electrode 201, a carbon counter electrode 202 and a reference electrode 203. In one embodiment the working electrode is screen printed with CuO nanoparticles mixed with carbon ink for the detection of glucose concentration in a sample. In another embodiment the working electrode includes an activated screen printed carbon electrode to determine uric acid concentration. The electrode may be activated in 1 M H2SO4 solution by electrochemically cycling the potential between −0.2 to 1.8 V for 20 or more potential cycles. In some embodiments the working electrode includes a screen printed carbon electrode and is configured to determine creatinine concentration in a sample. In another embodiment a screen printed carbon electrode printed with copper nanoparticles is included as the working electrode to determine bilirubin concentration. In yet another embodiment, to determine the concentration of cholesterol a pencil graphite electrode is used as the working electrode.

Figure 3:
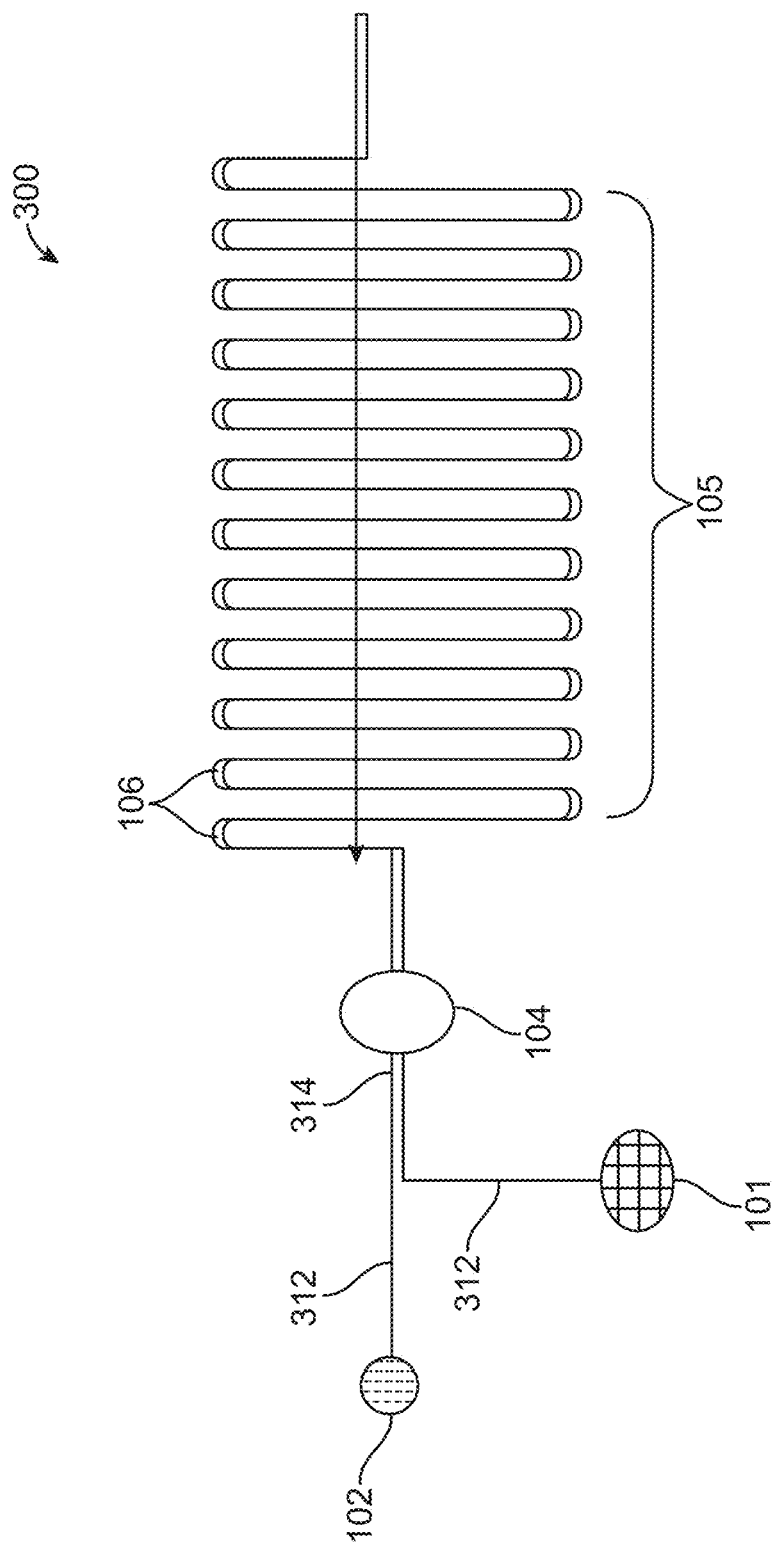
FIG. 3 depicts mass transport through the reagent and the analyte stream and the meander channels.

In one embodiment of the invention, the meander channels 105 as shown in FIG. 3 have alternately varying diameters for improving chaotic advections. In some embodiments, the meander channels 105 enhance the mixing of the analyte and reagent within the mixtures thereby thrilling a uniform solution. The uniform mixing is attributed to factors that include turbulence created by series of contractions and expansions through the meander channel and the curved portions that induce significant amount of centripetal force favoring radial motion of liquid. In one embodiment of the invention, a plurality of microchannels 312 connect each of the sample well 101 to the corresponding reagent well 102. In one embodiment, the sample streams are connected to the reagent stream at the inlet of the mixing well 104 by T-inlets 314.

Figure 4A:
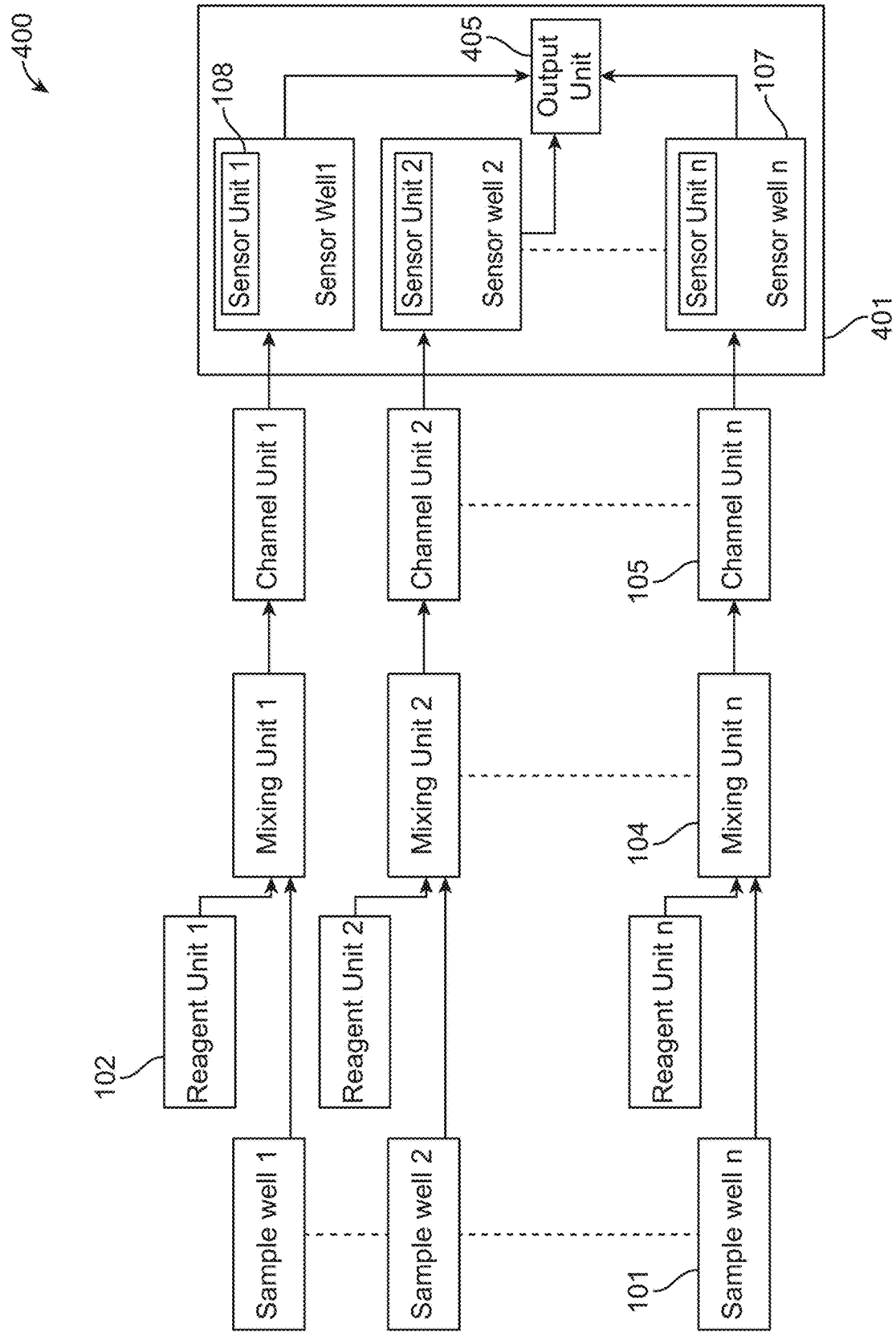
FIG. 4A shows a microfluidic device integrated as a Lab-on-a-chip device.

In various embodiments of the invention, the microfluidic device is incorporated in a LOC device 400, as shown in FIG. 4A. In certain embodiments, the device 400 includes a portable electronic meter module system 401 that is used for the detection of the concentration of analytes in patient samples which is sent to the output unit 405. In some embodiments, the electronic meter module system 401 works based on principles of amperometry.

Figure 4B:
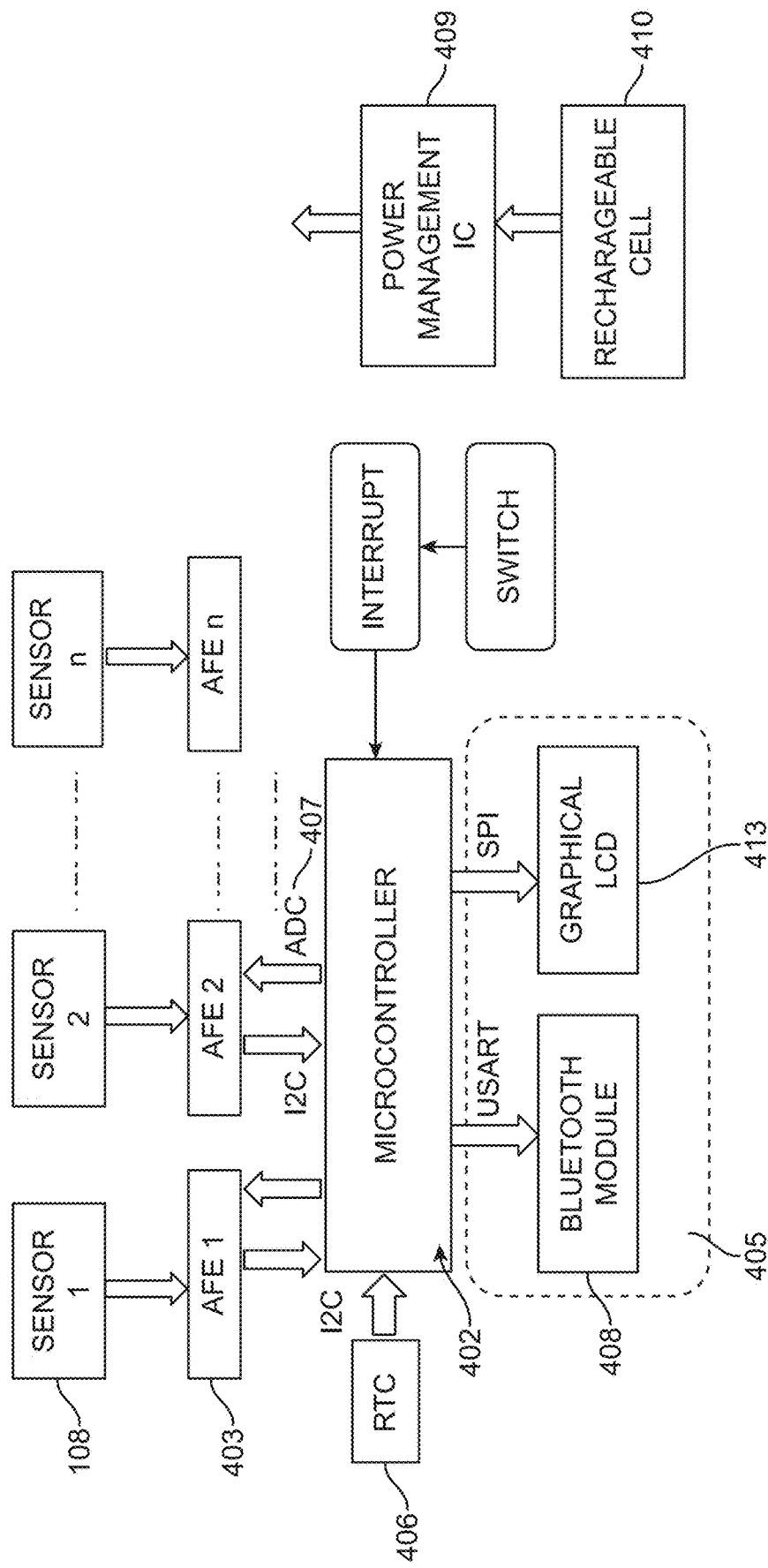
FIG. 4B shows the block diagram of an electronic meter module.

In some embodiments, the electronic module 401 includes a microcontroller 402 interfaced to all the individual modules as shown in FIG. 4B. The meter module 401 includes a multi potentiostat circuit made from a plurality of configurable potentiostats 412 that maintains a constant required potential across the working and counter electrode, with reference to the reference electrodes of all the sensors. The current produced from the electrochemical reaction is converted into voltage and fed to the microcontroller 402. The microcontroller 402 converts this voltage to corresponding analyte concentrations with the help of the calibration plot programmed into the microcontroller 402 and the results are displayed on a display unit 413.

The microcontroller 402, through executable computer program instructions stored in a non-transitory computer-readable storage medium, converts the obtained voltage into the corresponding analyte concentrations and sends the result to an output unit 405. The output unit 405 includes a graphical Liquid Crystal Display (LCD) unit 413 or a Bluetooth module 408 for wireless transmission of the output, or both. In some embodiments, a real time clock (RTC) 406 is connected to the microcontroller to time the operation.

The flow chart of the controller program starts with the initialization of serial peripheral interface (SPI) communication which is used by the controller 402 for communicating with the LCD 413. Upon initialization, commands are provided to the LCD module 413 for the desired operation, such as displaying a message. I2C communication 411 is used by RTC 406 and analog frond end (AFE) 403 connected to the controller 402. After AFE initialization, ADC module 407 is enabled for converting the analog into its corresponding digital value. After all the different modules are initialized, the system waits for the sample to reach the sensor chambers by continuously monitoring the output values of all AFEs. Once the sample reaches the sensor chambers, a change in current is detected. The microcontroller measures the voltage sequentially from each of the AFEs after predetermined time duration. The voltage is then converted to corresponding analyte concentrations and displayed on the LCD 413, the Bluetooth enabled device 408, or both.

In one embodiment the LOC device 400 is configured to simultaneously determine the concentration of one or more analytes from the samples of a plurality of subjects. In another embodiment the LOC device 400 is configured to simultaneously determine the concentration of one or more analyte from the samples of a subject.

In one embodiment all the sensor units 108-1, ... 108-n screen printed in the third layer may have similar working electrode. The microfluidic device in such an embodiment may detect the concentration of one analyte in a plurality of samples. In one embodiment the microfluidic device may determine the concentration of glucose in a plurality of samples. The plurality of sensor units have working electrodes screen printed with CuO nanoparticles mixed with carbon ink. The samples are kept in the sample well 101-1, . . . 101-$n$ and the reagent is kept in the reagent well 102-1, . . . 102-$n$. The reagent may also be kept in a common reservoir to which all the reagent well 102-1, . . . 102-$n$ are attached. The reagent from the reservoir fills the reagent wells 102-1, . . . 102-$n$. When a negative pressure is applied at the common outlet 109 the sample and the reagent mixes in the mixing well and flows to the sensor chamber through the meander channels. In the sensor chamber the mixture solution is contacted by the sensor and produces an output that indicates the concentration of glucose in each sample. In another embodiment when the plurality of sensor units have activated screen printed carbon electrode as working electrode the device determines the uric acid concentration in a plurality of samples. In some embodiments the device determines the creatinine concentration in a plurality of samples. The working electrode determines the creatinine concentration include screen printed carbon electrode. In various embodiments the working electrodes may include copper electrodeposited screen printed carbon electrode or a pencil graphite electrode. The device having such working electrodes may determine bilirubin concentration or cholesterol concentration respectively in a plurality of samples.

A point of care device that incorporates the LOC 400 is disclosed herein. The device may be used to simultaneously determine the analyte concentrations in the samples from a subject. The samples from the subject are filled in the sample wells in the device. The LOC is switched on and the different modules in the LOC initializes. Each reagent well receives reagent from a reagent reservoir that contains the reagent for a specific electrode configured to detect a particular analyte. The sample and the reagent mixes in the mixing well uniformly to form a sample mixture. The sample mixture then reaches the sensor chamber where it is contacted by a biosensor that has a working electrode that is specific to the detection of an analyte concentration. The voltage generated by each of the sensors corresponding to the analyte concentration in the sample is measured sequentially from each of the AFEs by the microcontroller in the LOC. The microcontroller converts the measured voltage to the corresponding analyte concentration and displays it in the display device of the LOC. The measured analyte concentration is then send to a Bluetooth enabled device that may belong to the subject or any care taker or a medical practitioner.

Figure 5:
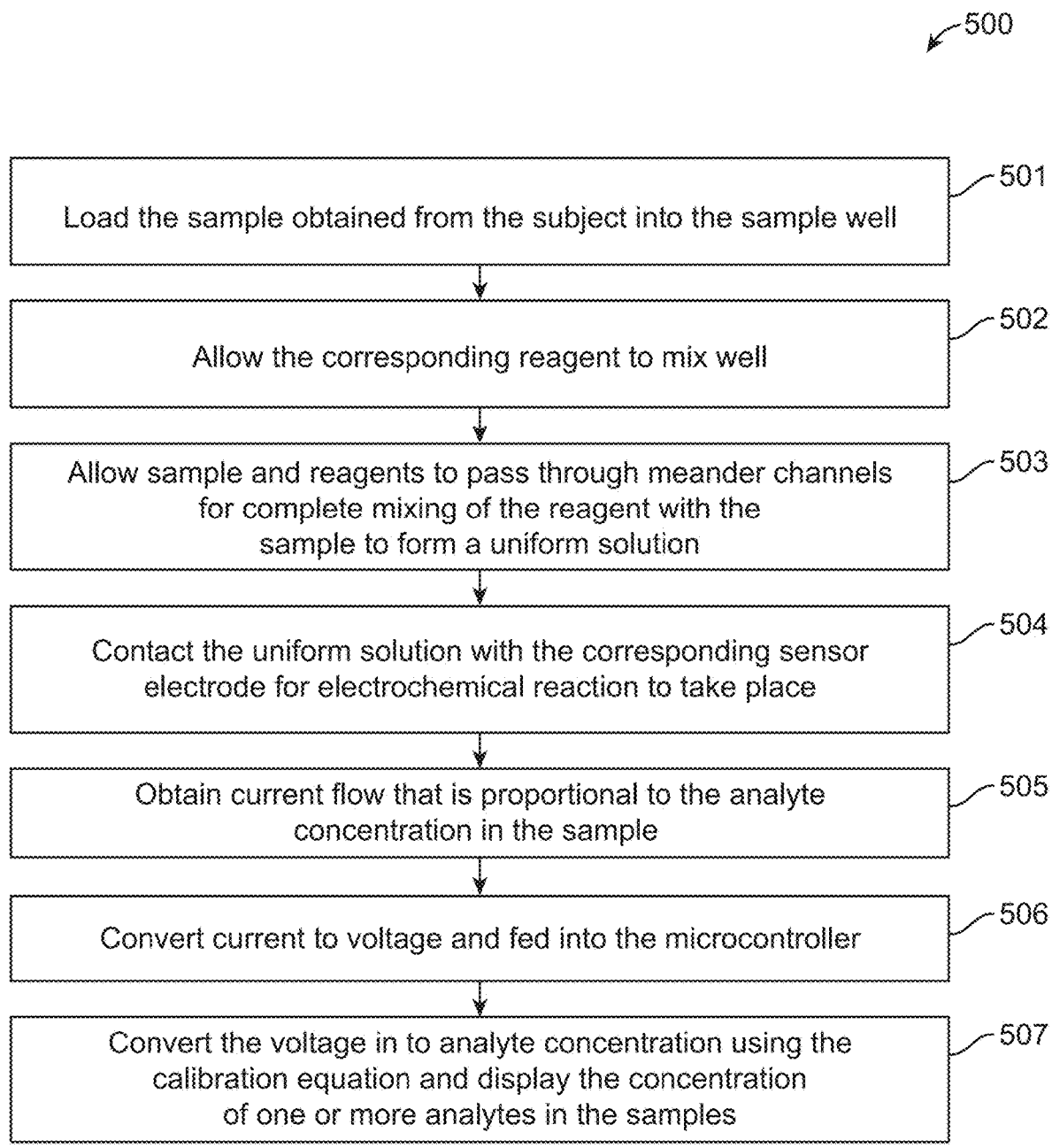
FIG. 5 illustrates the method of simultaneously determining analyte concentration in a plurality of samples.

In one embodiment, a method 500 for analyzing analyte concentration in a plurality of samples is disclosed, as shown in FIG. 5. In step 501, the plurality of samples obtained from one or more subjects are loaded in the sample well of tile array device. In step 502, pressure is applied to allow each of the samples to be mixed with the corresponding reagent in a mixing well. The reagent is analyte specific and is stored in reservoirs attached to each reagent well. In step 503, the mixed sample and reagents are allowed to pass through meander channels for complete mixing of the reagent with the sample to obtain a uniform sample mixture solution. In step 504, each sample mixture is contacted with a non-enzymatic biosensor that has a working electrode that is specific to an analyte. An electrochemical reaction takes place on the uniform solution and a current is proportional to the concentration of the analyte in the sample mixture is generated in step 505. In step 506 the obtained current is converted to voltage nd is fed into a microcontroller. The voltage that is proportional to the current generated determines the concentration of the analyte in the sample. In step 507, the voltage is converted to the corresponding analyte concentration using a calibration equation and the one or more analyte concentration in the plurality of samples is displayed. In some embodiments two or more sample wells are connected to a common sample reservoir to receive the samples of a subject. In yet other embodiments, two or more reagent wells are connected to a common reagent reservoir. The device in such a case may be used to analyze the concentration of same analyte present in different samples.

In various embodiments a method of fabrication of microfluidic array device and a method of testing the LOC are also provided. In some embodiments, the microfluidic array device is fabricated by thick resist photolithography using SU-8 for the fabrication of a master. The fabricated masters may be further used for stamp production of a first layer that includes sample wells, reagent wells, mixing wells, meander channels and sensor chambers by micro casting or soft lithography using PDMS for the parallelization of highly accurate template. A second PDMS layer comprising holes in predetermined positions with a circumference that matches the circumference of the sensor chamber in the first layer is fabricated. In some embodiments, the microfluidic array device fabrication integrates multiple sensors in a third layer. Different types of disposable biosensors that are configured to detect the concentration of analytes including glucose, cholesterol, creatinine, uric acid and bilirubin are screen printed on a PET substrate. In some embodiments, dry etching techniques such as plasma, chemical, physical and deep reactive ion etching and additive techniques such as chemical vapor deposition, physical vapor deposition, screen printing is used for integration of sensors into the microfluidic systems. In various embodiments the first layer and the second layer are treated with corona discharge plasma and the first layer is disposed on the second layer and bonded such that the sensor chambers in the first layer fit the holes in the second layer. The bonded first layer and the second layer are then disposed on the third layer and bonded with uncured PDMS that is spin coated on the second layer. The bonding of the third layer facilitates fluidic contact of the biosensor and the sensor chamber. In some embodiments, the bonding of PDMS stamp may be done by partial curing, surface oxidation with wet chemicals, corona, or plasma treatment, adhesives and/or adhesive tapes. LOC device for the detection of different analyte may be realized using the principles of hydrophilicity and electrowetting for the manipulation of fluid.

The advantages of the method of fabrication include biocompatibility, high optical transparency, good mechanical durability, stability against variation in temperature and humidity. The disclosed devices and methods may be used for simultaneous measurements of samples from one or more patients and is suitable for mass population screening. The device is capable of analyzing biochemical liquid samples like solutions of metabolites, macromolecules, proteins, nucleic acids or cells and viruses. Also the device facilitates fluidic transportation, sorting, mixing and separation of liquid samples. The advantages of the LOC device include compactness, accurate diagnosis, portability, modularity, re-configurability, embedded computing, automated sample handling, low electronic noise, limited power consumption and straight forward integration of components. Also, since the volume of sample is very small, the Lab-on-a-Chip devices reduce analysis time. The LOC device may revamp healthcare by providing access to affordable technology for better management of diseases and related complications at every door step.

Although the detailed description contains many specifics, these should not be construed as limiting the scope of the invention but merely as illustrating different examples and aspects of the invention. It should be appreciated that the scope of the invention includes other embodiments not discussed herein. Various other modifications, changes and variations which will be apparent to those skilled in the art may be made in the arrangement, operation and details of the system and method of the present invention disclosed herein without departing from the spirit and scope of the invention as described here. While the invention has been disclosed with reference to certain embodiments, it will be understood by those skilled in the art that various changes may be made and equivalents may be substituted without departing from the scope of the invention. In addition, many modifications may be made to adapt to a particular situation or material the teachings of the invention without departing from its scope.

EXAMPLE

Example 1: Lab On Chip (LOC) Device Fabrication, Testing and Validation

Materials and reagents: SU-8 negative photoresist (GM1075, 100 µm-400 µm) was purchased from Gersteltec Sarl (Switzerland). PDMS (184 silicon elastomer) prepolymer and curing agent was obtained from Dow Corning (Midland, USA). Polyethylene glycol (P3015, MW200) and D-(+)-glucose, creatinine, cholesterol and uric acid were purchased from Sigma Aldrich, Bangalore. Bilirubin was purchased from TCI Co. Ltd. (www.tcichemicals.com). Inks for screen printing, silver (5874). AgCl (5064H), carbon (BQ242) were obtained from DuPont Ltd. PET substrate for screen printing and circular glass plates (diameter 4', surface roughness ≤10 µm, thickness 2 mm) were obtained from local manufacturers. All other chemicals were of analytical grade and used as received. Piranha solution was prepared by mixing concentrated $H_2SO_4$ and $H_2O_2$ (30%) in the ratio 3:1. Flow visualization and mixing studies were carried out with colored solutions. All solutions used were prepared with milli-pore water.

Apparatus: Maskless photolithography unit (µPG-101, Heidelberg Instruments, Germany) was used for the microfabrication using SU-8 negative photoresist. Optical imaging of the microfluidic system was carried out using ARCS video measuring system (MM-15, Taiwan). Surface profile was studied with NanoMap-PS surface profilometer (aep Technology, USA). The IR spectroscopic studies were carried out on JASCO 460 Plus FTIR spectrophotometer (Pike Technologies, USA). Contact angle measurement was conducted using contact angle tester (Kruss GmBH, Germany). Tensile test was done with Zwick Roell Tensile Tester (Zwick Asia Private Limited, Singapore). Electrochemical experiments were carried out using CHI 660C electrochemical workstation (CH Instruments, TX, USA). PDMS samples were surface treated with BD-20ACV hand held corona treater (Electra-Technic Products, USA). Texas Instrument (TI) LMP91000 is used as the analog frond end (AFE).

LOC device fabrication: Master-stamp technique was used for low cost parallel replication of microfluidic platforms. The master was developed with the photolithography using SU-8 photoresist and PDMS micro channels (stamp) were fabricated with the help of this template. The master fabrication involves a series of steps including substrate preparation, prebake, exposure, post exposure bake and development. Initially the glass substrate was cleaned with piranha solution, rinsed thoroughly with millipore water and baked at 130° C. for 30 min. The negative photoresist, SU-8 was spin coated on the substrate at a spin cycle of 1000 rpm for 100 s followed by a spread cycle of 1400 rpm for 10 s and prebaked at 120° C. for 30 min. The pattern to be developed was exposed on the prebaked photoresist using maskless lithography at optimized exposure energy of 56 mW. A hard bake at 95° C. for 90 min was carried out for the thermal amplification of polymerization. Non polymerized regions were removed during development process. The master thus obtained was further used for soft lithography. The base and curing agent SYLGARD 184 elastomer were thoroughly mixed in the ratio 10:1 and dispensed on the master placed in a petridish. The air bubbles were removed using a vacuum desiccator. After degassing, the PDMS was cured at 100° C. for 30 min and stamp was peeled off from the master.

The microfluidic channels were designed using CADian and CleWin softwares. The LOC is divided into four zones, sample, passive micromixer, detection and outlet zones. The sample zone consists of primary and secondary sample inlet reservoirs each with a diameter and depth of 4 mm. Micro channels carrying fluids to the wells are placed in such a way that equal quantity of sample 1 and 2 enter into the well. The well is followed by meander shaped passive micromixers. The microchannel has a depth of 0.1 mm and the diameter is alternatively varying in the ratio 1:2 (0.2 and 0.4 mm). Fluid from passive micromixer zone is fed into the detection wells with a diameter of 6 mm and a depth of 0.12 mm. Sensors are placed in the detection wells and electrochemical detection of analytes is performed in this area. The detection wells are connected to the outlet 'O' which is connected to a syringe for providing necessary negative pressure. CFD package, COMSOL Multiphysics was used to carry out the numerical analysis of fluid flow through the proposed micro channels. CFD studies were carried out with water and ethanol as primary and secondary fluids respectively. Inlet and outlet pressure were set as atmospheric pressure and 0 Pa respectively. No slip boundary condition was assumed at the inner walls of the micro channels. Transport of dilute species was used for analyzing the extent of mixing between the primary and secondary streams. The design was modeled in such a way that primary and secondary streams have an analyte concentration of 1 (red) and 0 (blue) respectively. When complete mixing occurs in the concentration of analyte will be 0.5 (green) throughout the cross section of the microchannel. The number of meanders required for homogenous mixing was optimized by analyzing the concentration profile through the meanders.

Figure 6C:
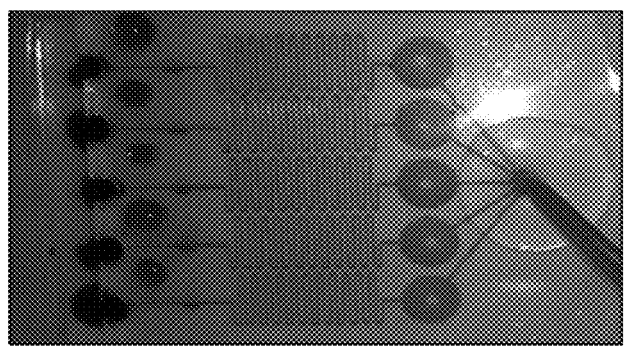
FIG. 6C illustrates the optical image of mixing inside the microchannels.
Figure 6B:
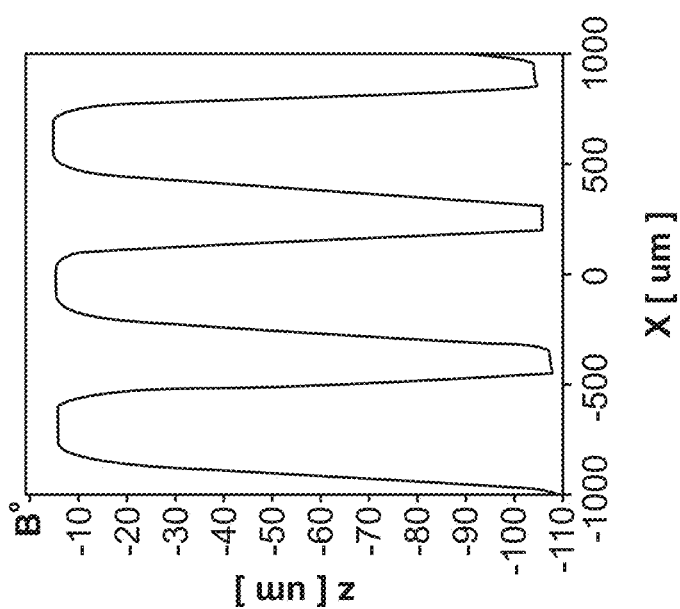
FIG. 6B shows the surface profile showing the microfabricated structures.
Figure 6A:
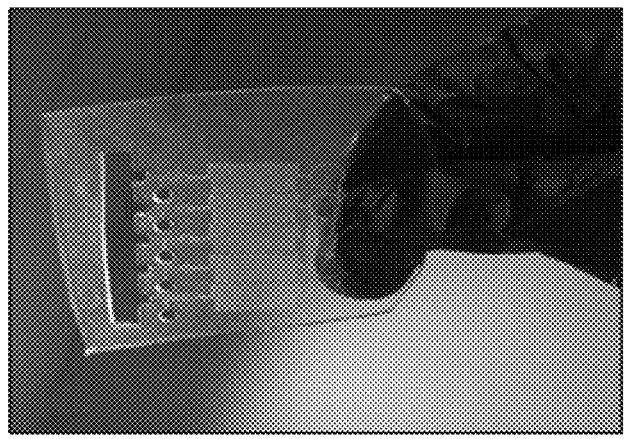
FIG. 6A shows the stamp fabricated by soft lithography.

Optical photographs of stamp as shown in FIG. 6A show clear patterns of the fabricated structures. The surface profile shows that the micro fabricated structures have a uniform depth of 115 µm in the vertical axis (FIG. 6B). For the flow visualization studies, colored solutions were introduced into the inlet reservoirs and the outlet was connected with a syringe using plastic tubing. The negative pressure produced by syringe caused the movement of the colored solutions through the channels. The extent of mixing was analyzed by visualizing the change in color. To verify the CFD simulation results experimentally, yellow and violet colored solutions were used as primary and secondary solutions respectively. It was observed that mixing started at the point of convergence between the fluids and a completely mixed solution (red) was obtained at the outlet (FIG. 6C). The 3D simulation results obtained using COMSOL Multiphysics provided the extent of mixing in meander shaped passive micromixer. The meander structures increase the residence time of fluid in the microchannel resulting in increased contact time between the two fluids. Alternately varying diameters were used in the meanders, as they showed efficient mixing than micro channels having the same dimension. Also, the geometry is such that chaotic advections are introduced in the microchannel. The concentration-distance profiles clearly show that the concentration of species becomes 0.5 when it reaches 12th meander. Hence, the number of meanders required for effective mixing was optimized as 12.

Figure 7B:
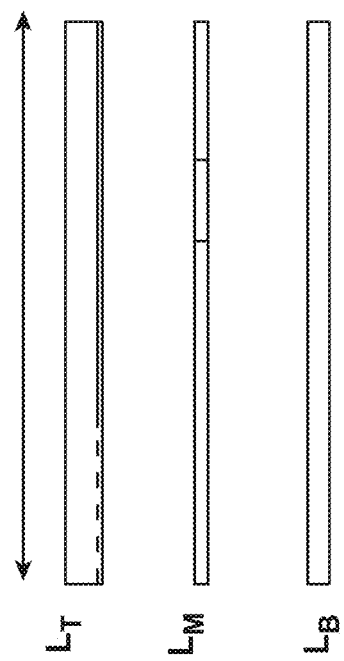
FIG. 7B illustrates the prototype having three layers.
Figure 7A:
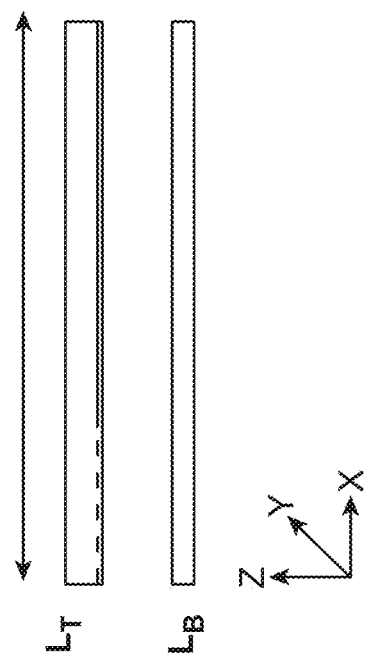
FIG. 7A illustrates the prototype having two layers.

LOC prototypes fabricated by two different methods were used to study the efficiency of well filling. The first prototype had two layers as illustrated in FIG. 7A, PDMS stamp as top layer (LT) and PET substrate as bottom layer (LB). The second prototype as illustrated in FIG. 7B developed had an additional middle PDMS layer (LM) of 500 μm thickness. For this purpose 5 g of PDMS was cured on a flat surface and three holes of 6 mm diameter were punched on it at the position of detection wells in LT. The addition of middle layer increased the depth of detection wells. LM and LT layers were treated with hand held corona by placing at a distance of 1 cm for 10 s. For the Chemical bonding to occur the treated surfaces were pressed each other and left undisturbed overnight. To obtain a tight sealing between middle and bottom layer, a very thin layer of uncured PDMS was used as adhesive on the middle layer by spin coating 1 g of PDMS at 2500 rpm for 100 s. The fluidic well filling analysis was conducted in both the two and three layer systems. The best fluid filling behavior was observed for a three layer system. Addition of middle layer, a novel strategy resulted in "fluid fall" from the top layer to base layer improving fluid coverage in detection wells.

Bond strength analysis: Bond strength analysis was carried out to study adhesion force between PDMS (LT)-PDMS (LM) and PDMS (LM)-PET (LB) after binding. Rectangular samples of 10 cm×1 cm were used and the peel strength was calculated from the obtained maximum tensile force. Cross head rate was fixed as 20 mm/min. For the analysis 50 mm of the sample was carefully peeled off from the substrate and free edges were connected with screw grip. From the Fmax obtained the peel strengths were calculated to be 70.1 N/m and 22.8 N/m for PDMS-PDMS and PDMS-PET respectively. The result obtained was in agreement with that reported for PDMS-PDMS bonding by surface oxidation method (Yu L. The adhesion of poly (dimethyl siloxane) to silica substrates, 2014). Although the peel strength obtained for PDMS-PET was low due to the absence of strong chemical bonds, the physical forces existing between the layers is sufficient for a stable bonding which was evidenced from the fluid flow studies.

Fabrication of sensors: Non-enzymatic electrochemical sensors for glucose, cholesterol, creatinine, uric acid, and bilirubin were fabricated using disposable electrode. Prior to screen printing, the PET sheet was cleaned with acetone and was-pre-heated at 90° C. for 12 hours. The first layer printed on the PET substrate was the silver conducting layer. Ag/AgCl was then applied to the tip of the reference electrode. The silver layer was then coated with conductive carbon ink to prevent it from oxidation. Thermal curing at 65° C. for 60 min was carried out after printing of each layer. Glucose sensor was fabricated using CuO nanoparticles as catalyst for electrochemical oxidation of glucose. The nanoparticles were prepared by using a two-step wet chemical method. The procedure was as follows: 26 ml of ammonia was added dropwise to 700 ml of $CuSO_4$ (0.05 M) under constant stirring. Subsequently 140 ml of NaOH (1 M) was added dropwise which resulted in a blue color precipitate ($Cu(OH)_2$). The precipitate was filtered and washed with distilled water for several times to remove the impurities and dried at 60° C. for 12 hours. This was annealed at 400° C. for 3 hours resulted in CuO nanoparticles. For the fabrication of sensor, CuO nanoparticle was mixed with carbon ink (33% w/w) and screen printed on the working electrode and cured at 45° C. for 1 hour. Uric acid detection was performed on activated screen printed carbon electrodes. The electrode activation was carried out in 1 M $H_2SO_4$ solution by electrochemically cycling the potential in between −0.2 to 1.8 V for 20 potential cycles. Detection of bilirubin was performed on screen printed carbon electrodes. Detection of creatinine was carried out on copper electrodeposited screen printed carbon electrodes. Copper was electrodeposited on the electrode from a solution containing 0.1 M $CuSO_4$ in 0.1 M $H_2SO_4$ at a constant potential of −0.6 V. Detection of cholesterol was performed on pencil graphite electrodes. LOC for the simultaneous detection of glucose, cholesterol, creatinine, uric acid and bilirubin was fabricated by integrating all the sensors on a single PET sheet. The respective electrolytes were used as secondary streams and samples solution with analytes is used as primary stream. Electrochemical testing was performed with the parameters discussed above.

A three layer prototype was used for all the studies. The sensors were incorporated in the bottom PET substrate by screen printing. The device fabrication does not involve any complex steps and used micro techniques such as soft lithography and screen printing. Simplicity of the process makes this adoptable as global platform for electrochemical sensing.

Figure 8B:
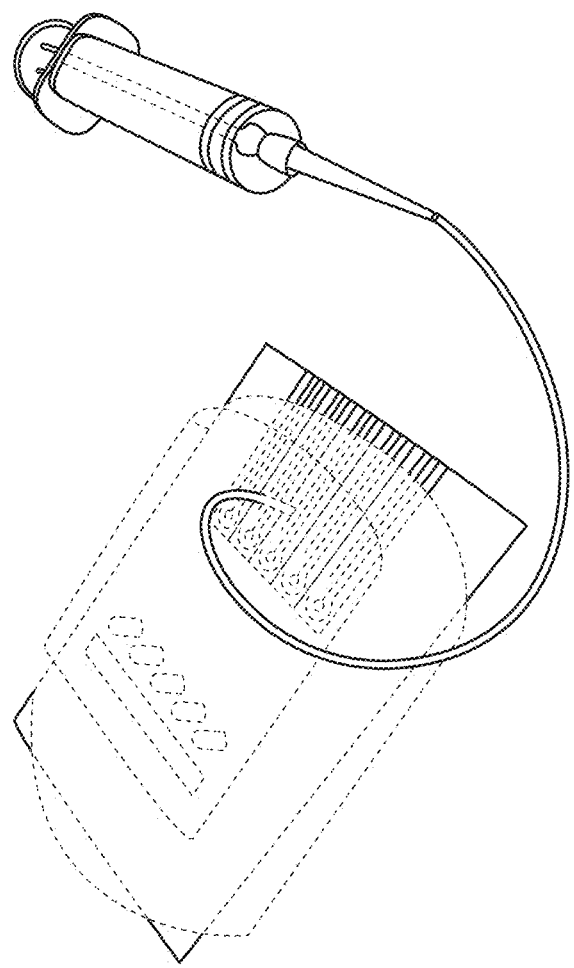
FIG. 8B shows the LOC prototype after complete assembly of layers.
Figure 8A:
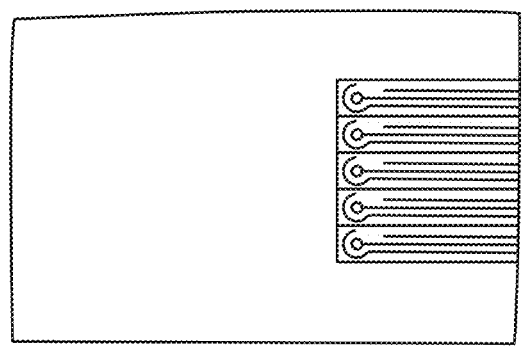
FIG. 8A shows the screen printed electrodes on PET.

The picture of the screen printed electrodes on PET is shown in FIG. 8A. The middle layer was placed on the top of PET substrate such that the sensors were within the inner diameter of the detection in LM. The bonding between LT-LM and LM-LB was performed by corona oxidation and uncured PDMS as adhesive respectively. The photograph of the final LOC prototype is shown in FIG. 8B.

Testing of the LOC system: In order to test the working of the fabricated microfluidic device, all the sensor wells were integrated with electrochemical sensors. For glucose detection, 0.2 M NaOH was used as the primary stream and glucose solution of various concentrations were used as the secondary stream. Electrochemical detection was carried out at a potential 0.5 V. For the detection of bilirubin, 0.05 M trizma buffer was used as primary stream and bilirubin solutions were used as secondary stream. Differential pulse voltammetry (DPV) was carried out at a potential window of 0 to 0.6 V. Phosphate buffer saline (0.2 M) was used as primary stream and uric acid solution was used as secondary stream in the LOC for uric acid detection. For the electrochemical detection, LSV was carried out at a potential window of 0.6 to 0 V at a scan rate of 100 mV/s. Cholesterol detection was performed with cholesterol and acetonitrile solutions. Electrochemical detection was carried out voltammetrically at a potential window of 0.8 to 2 V at a scan rate of 100 mV/s. For creatinine detection, 0.1 M phosphate buffer solution was used as the primary stream and various concentrations of creatinine were used as the secondary stream. Electrochemical detection was carried out voltammetrically at a potential window of −0.6 to −0.6 V at a scan rate of 100 mV/s.

Validation of LOC performance: A three layered assembly was used to fabricate the LOC prototype due to the excellent flow and well filling behavior. Electrochemical detection of glucose was carried out using the LOC platform developed. For testing the LOC platform all the sensor wells were integrated with glucose sensors and applied the potential as discussed.

Figure 9A:
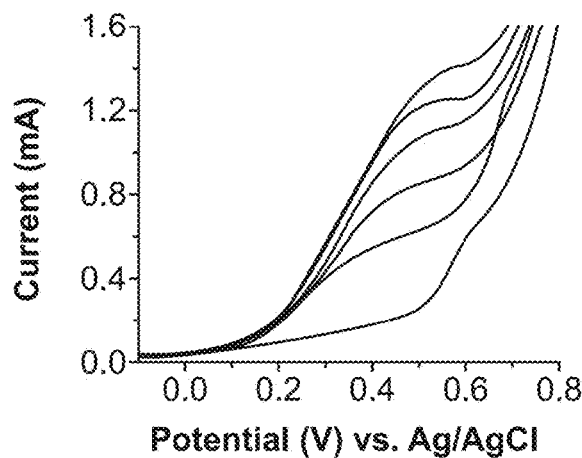
FIG. 9A illustrates the LSVs recorded for different concentrations of glucose within a single detection well.

FIG. 9A shows the voltammetric response to glucose obtained using the LOC device. 0.2 M NaOH was used as the primary stream and 6, 12, 18, 24 and 30 mM glucose were used in the secondary streams. The faradaic peak observed at 0.5 V is due to the electrochemical oxidation of glucose by copper oxide nanoparticle in the alkaline medium. In the passive micromixer zone, mixing between the solutions took place and the concentration of the sample reduced to half. The sensor showed a linear response upto 60 mM glucose with a regression coefficient of R2=0.985.

Figure 9B:
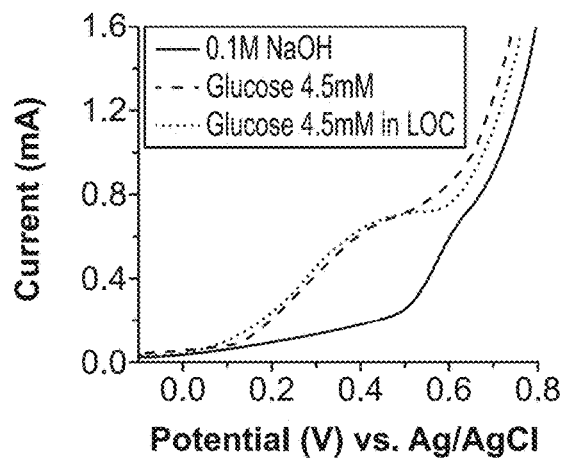
FIG. 9B illustrates the LSVs recorded for premixed solutions of NaOH and glucose and after mixing inside microchannels.

In order to study the efficiency of mixing in microfluidic channels, voltammetric response of premixed solutions of NaOH and glucose was compared with those obtained from microfluidic mixing. For this 4.5 mM glucose solution was prepared in 0.1 M NaOH and was dropped on the sensor and tested. While in the LOC, 9 mM glucose in the secondary inlet and 0.2 M NaOH in the primary inlet were passed through the microfluidic mixer. Linear sweep voltammogram were recorded in both the cases (FIG. 9B) and the results are found to be in good agreement. This experimentally proves the complete mixing inside the microfluidic channels. To ensure uniform filling of microfluidic detection well in each use, electrochemical response of 6 mM glucose in a single well was recorded for five different trials. The sensor response was found to be similar in all five trials (RSD=0.55%, σ=0.0044) (FIG. 9D). The stable electrochemical response indicates the uniform filling of solution in the sensor well and stability of sensor electrode with the repeated usage.

Figure 9C:
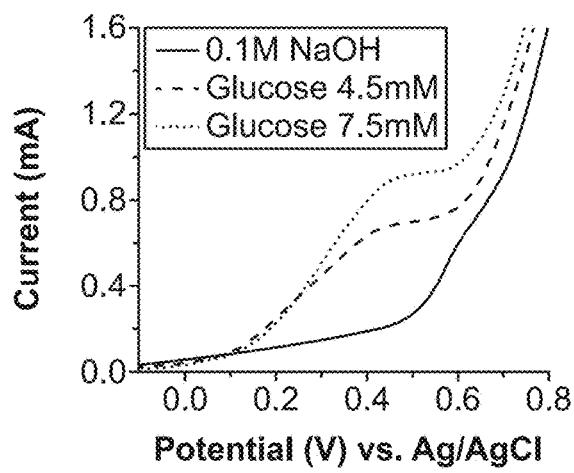
FIG. 9C illustrates the LSVs recorded for different concentrations of glucose in different detection wells with LOC.
Figure 9D:
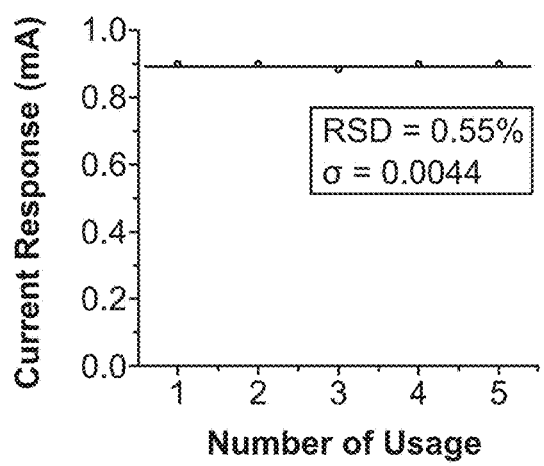
FIG. 9D shows the response of 6 mM glucose in the same sensor well for five repeated trials in LOC.

The result of linear sweep voltammogram obtained for three different concentrations of glucose on different detection wells is shown in FIG. 9C. For this experiment 0, 9 and 15 mM of glucose were provided at the secondary inlets and 0.2 M NaOH in the primary inlet. After mixing the concentration of glucose reaches at the detection well is half of the original concentration. It was found that the LOC responds to analyte molecule quantitatively.

Figure 10B:
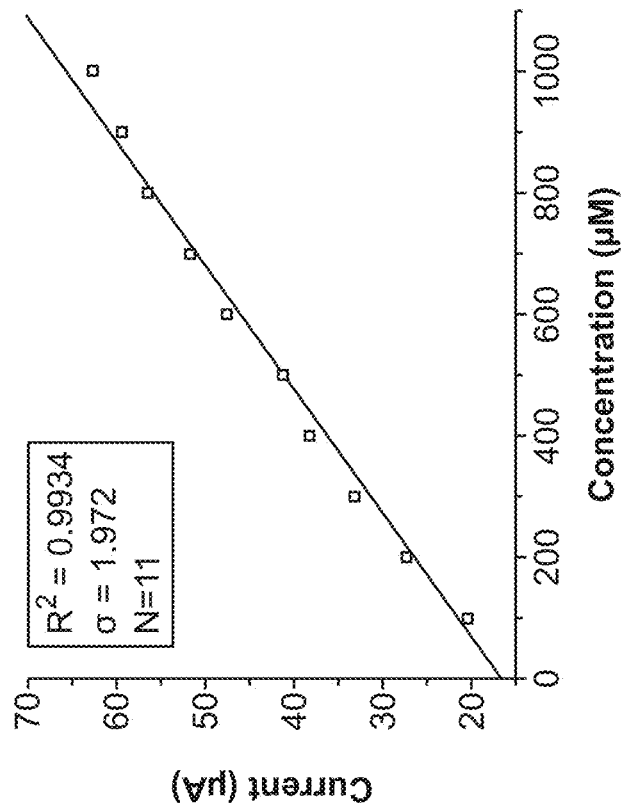
FIG. 10B shows the plots of peak current versus different uric acid concentration.
Figure 10A:
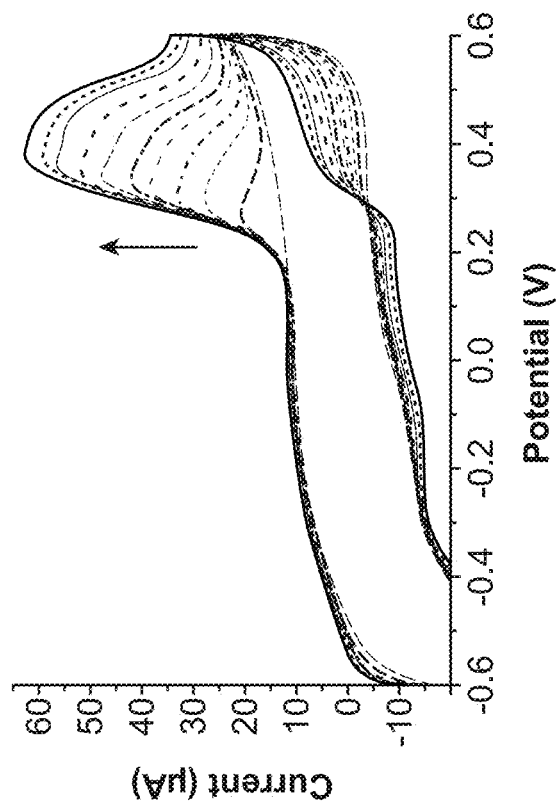
FIG. 10A shows the voltammograms recorded with LOC with different concentrations of uric acid in 0.1 M PBS at a scan rate of 100 mV/s.
Figure 11A:
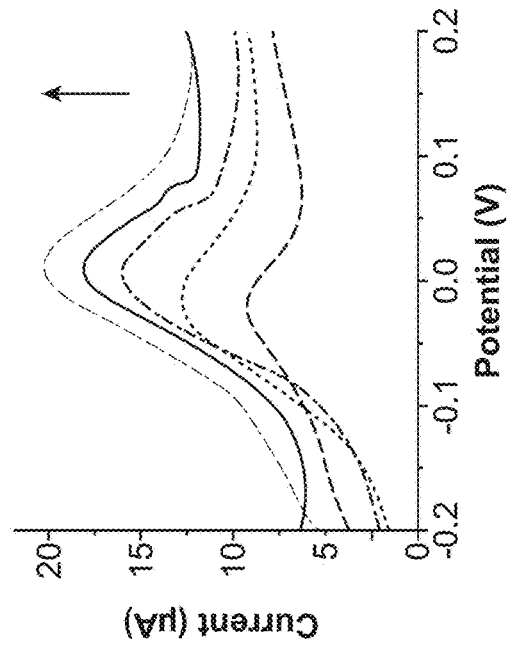
FIG. 11A shows the linear sweep voltammograms recorded on the pencil graphite electrode in acetonitrile for different cholesterol concentrations with increment of 0.625 mM.
Figure 11B:
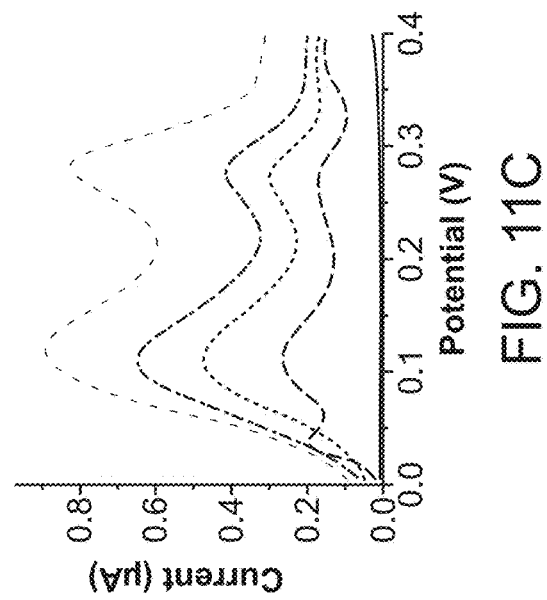
FIG. 11B shows the linear sweep voltammograms recorded on copper electrodeposited SPCE in 0.1 M PB with increasing concentrations of creatinine with increment of 30 µM.
Figure 11C:
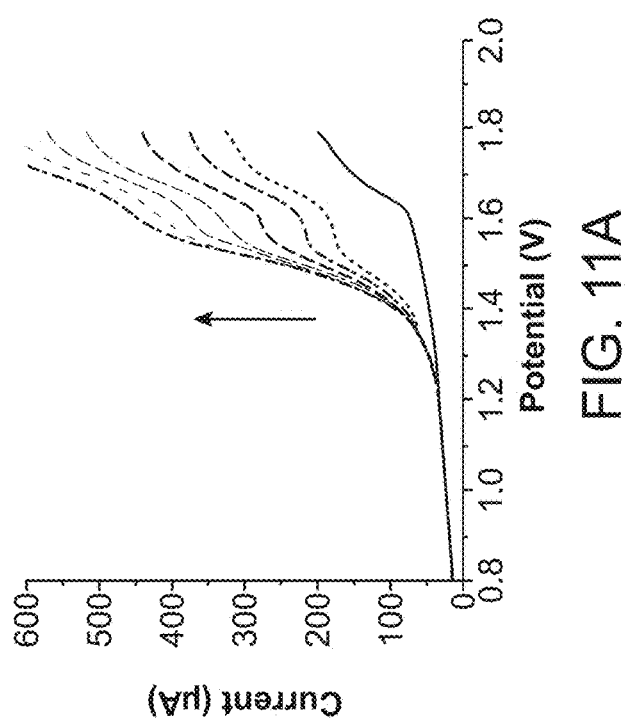
FIG. 11C illustrates the DPVs recorded on SPCE in 0.05 M trizma with different concentrations of bilirubin with increment of 50 µM.

Similarly to glucose, the electrochemical testing of uric acid was performed with the LOC. Electrochemical oxidation of uric acid on activated carbon electrodes is well known. The uric acids of concentrations 100-1000 μM were tested on the sensor electrode inside the LOC [FIG. 10A]. Using peak currents, calibration curve of peak current versus concentration was plotted [FIG. 10B] and it was found that the sensor response is linear with a calibration equation of IP (μA)=0.0488C (μM)+16.564 with R2=0.993. FIG. 11A shows the cholesterol concentration upto 4375 μM. This has been tested for the normal and higher concentrations of cholesterol. The electrochemical detection of creatinine was carried out on the modified electrode in PB of 7.4. Known concentrations of creatinine were used for analysis and found that the peak current increases linearly with increase in the creatinine concentration [FIG. 11B]. Similarly different concentrations of bilirubin samples were tested with LOC and anodic current found to be increasing with concentration [FIG. 11C].

Example 2—Fabrication and Testing of an Indigenous Meter for Simultaneous Detection in LOC A handheld electronic meter based on electrochemical principle was fabricated for the simultaneous detection of glucose, cholesterol, creatinine, uric acid and bilirubin. For this, a multi potentiostat circuit was designed that can maintain potentials across the counter and working electrodes of all the sensors. The analog front end (AFE) IC is used as the potentiostat.

Figure 12:
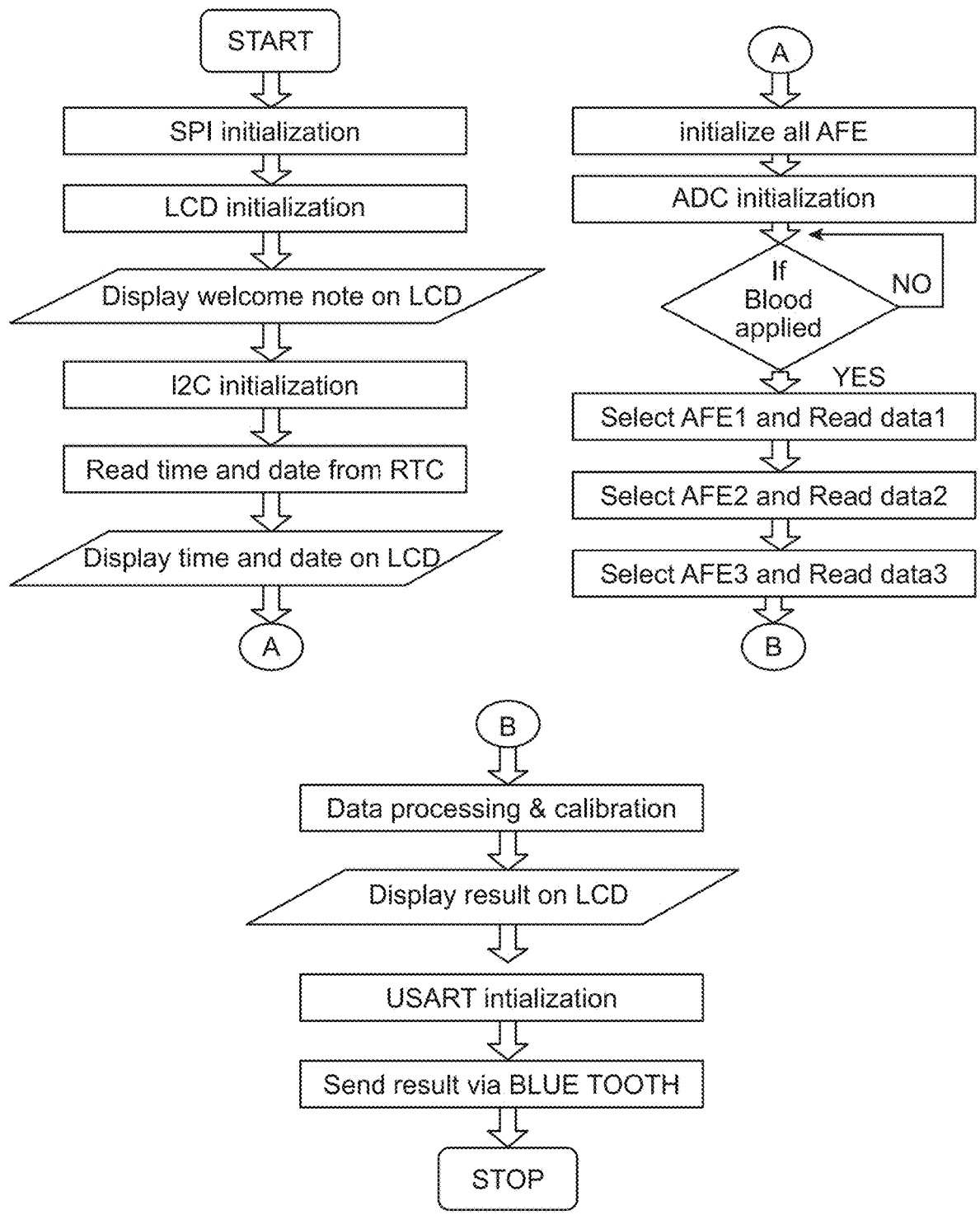
FIG. 12 illustrates the flowchart of the control program.

Microchip's enhanced midrange microcontroller PIC16LF1783 is used as the brain of the system. The controller controls AFEs, RTC, LCD and BLUETOOTH modules. Texas Instrument (TI) LMP91000 is used as the Analog Frond End (AFE). This IC acts as the potentiostat for electrochemical reaction. The advantage of this IC is that it is programmable. The cell bias and transimpedance amplifier gain can be easily programmed through the I2C interface, helping maintain the required potential for the different sensors accurately as well as obtain current readings that are easily measurable. LMP91000, has two operational amplifiers, one acts as the control amplifier (AI) and the other one is the trans impedance amplifier (TIA). Control amplifier is used to maintain a constant potential between the working and reference electrodes. Transimpedance amplifier helps convert the current to its corresponding voltage level. The flow chart of the control program is shown in FIG. 12.

Flow chart starts with the initialization of SPI communication which is used by the controller for communicating with the LCD. Initialization provides commands to the LCD module for the desired operation. After initialization, the welcome note is displayed on the screen. I2C communication is used by RTC and AFE. After AFE initialization, ADC module is enabled for converting the analog into its corresponding digital value. After all the different modules are initialized, the system will wait for the sample to be applied by continuously monitoring the output values of all AFEs. Once the sample reaches the analysis wells, a change in current will be detected. Once this change is detected, the microcontroller will measure the voltage sequentially from the AFEs after predetermined time duration. The voltage is then converted to the corresponding analyte concentration and displayed on the LCD. Using Bluetooth communication, the result can be sent to Bluetooth enabled device.

Integration and Working of the indigenously developed meter with LOC: After the successful testing of the device with the laboratory potentiostat, the LOC device was integrated with the indigenously developed programmable electronic meter. When the meter is turned on, the bias voltage is set to '0' and no electrochemical reaction occurs during the filling up of the analysis wells. After all the analysis wells are completely filled, the electronic module provides the preprogrammed potentials to the working electrodes of all the sensor electrodes. This resulted in the oxidation of respective analytes on the working electrode and a voltage proportional to the reaction current is made available to the microcontroller from each AFE. With the help of the calibration equation programmed into the microcontroller, the obtained voltage is converted to the corresponding analyte concentrations and the results were displayed on the graphical LCD screen. The LOC was tested with the electronic meter developed.

Figure 13B:
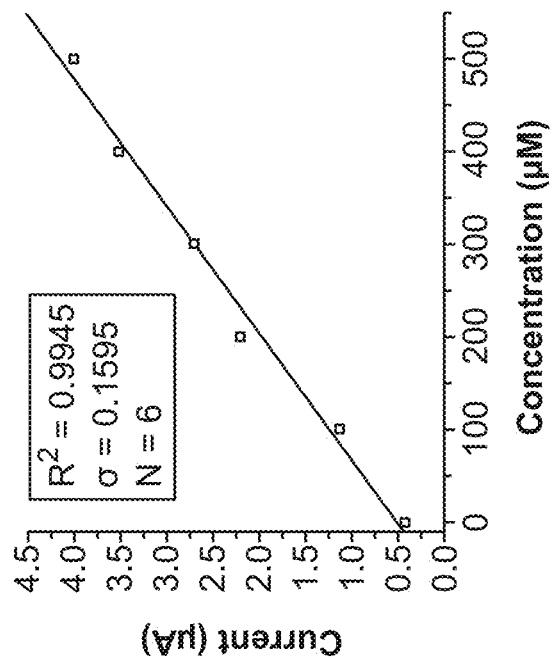
FIG. 13B shows the calibration plots of concentration versus current obtained by testing the LOCs integrating with indigenously fabricated electronic meter with different concentrations of uric acid.
Figure 13A:
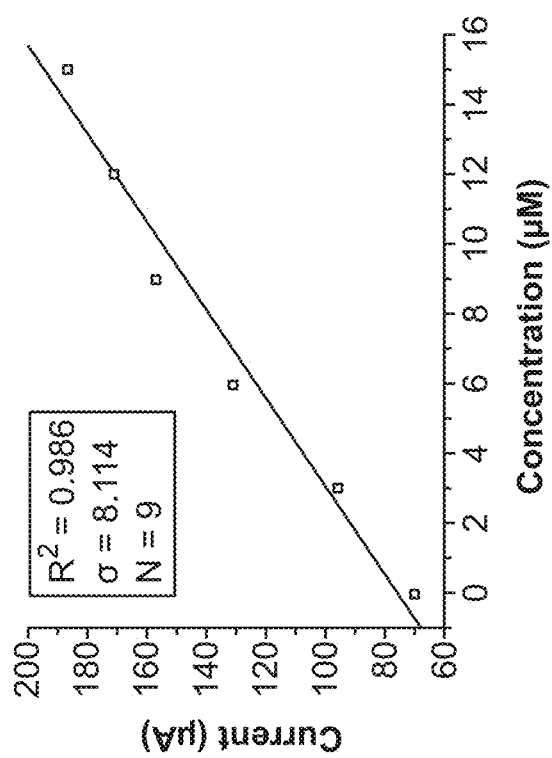
FIG. 13A illustrates the calibration plots of concentration versus current obtained by testing the LOCs integrating with indigenously fabricated electronic meter with different concentrations of glucose.

FIG. 13A and FIG. 13B show the plots of concentration versus current response obtained on the LOCs by testing with indigenously made electronic meter with different concentrations of glucose and uric acid respectively. The meter response was found highly correlative with the results obtained by testing the LOC with the electrochemical workstation. The integration and testing of LOC with the meter increased the application of the device in point of testing where, the entire system can be used as a standalone unit.

A lab-on-a-chip technology for simultaneous detection of analytes was designed, simulated and fabricated. Simulation studies showed that microfluidic channels with alternatively varying diameter exhibited excellent mixing properties. Further, a three layered assembly with a novel strategy of fluid fall from the top layer to base substrate improved fluid coverage in all detection wells. All the three layers were successfully bonded without leak and the experimental conditions were optimized. Screen printed non enzymatic electrochemical sensors for glucose, creatinine, bilirubin, cholesterol and uric acid were successfully integrated and tested. A handheld meter was developed indigenously to integrate with LOC, and this has increased the application of LOC in point of care testing.

Figure 14:
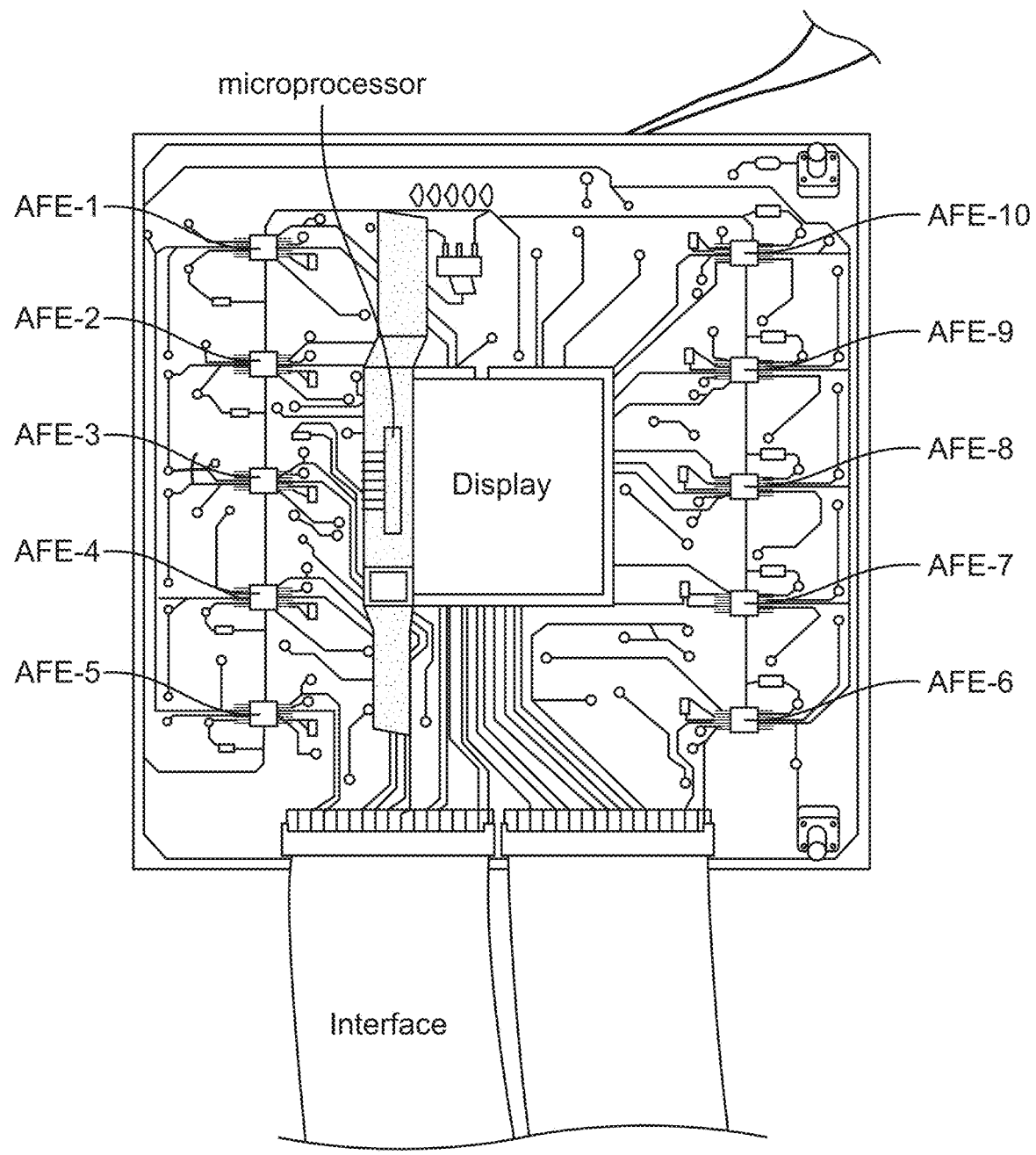
FIG. 14 shows the multi potentiastatic meter.

Multi-potentiostat configuration: For developing the multi potentiostat circuit, ten different analog front ends were connected to SCL and SDA pins of the microcontroller. The Multi-potentiostat configuration of AFEs is shown in FIG. 14. The SCL and SDA pins are common to the ten AFEs. Three different MENB ports of the microcontroller were connected to the three different AFEs. The microcontroller was programmed to activate the AFE sequentially through the MENB. The communication between the AFE and microcontroller was carried out using Inter-Integrated circuit (I2C) protocol. I2C communication commonly uses two wires for data transfer—SCL and SDA. In the case of multi-potentiostat circuit, it uses 10 separate AFEs and all AFEs (LMP91000) were given the same fixed seven bit address (1001000). If the MENB pin of a particular AFE is at logic level low all the I2C communication was enabled to that AFE and communication was disabled if MENB was at high logic The AFE is configured as 3-lead amperometric set up using the MODECN register. Suitable bias voltage, bias sign and internal zero values were set using REFCN register. Rload value and TIA gain were set using TIACN register. The potentiostat maintained a constant potential and electrochemical reaction current was converted to voltage and the change in voltage was observed.

Figure 15B:
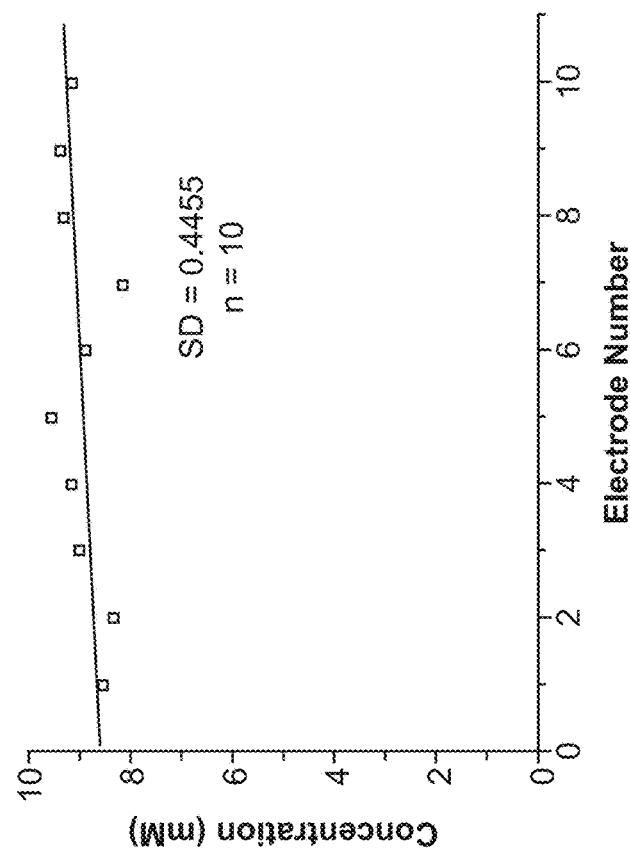
FIG. 15B illustrates the potentiostatic meter result for the glucose concentration of 9 mM for different electrodes.
Figure 15A:
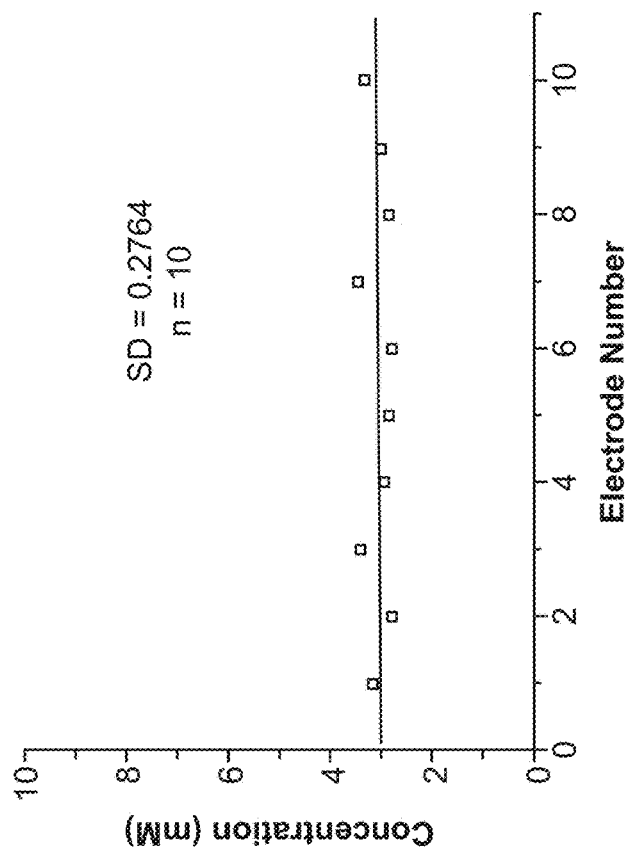
FIG. 15A depicts the potentiostatic meter result of the glucose concentration of 3 mM for different electrodes.

Working and integration of the potentiostatic meter module with the array device. The potentiostatic meter module was tested for the variation in glucose concentration values in a plurality of electrodes with the known glucose concentration of 3 mM and 9 mM. When the meter is turned on, the bias current is set to '0' volts so that no current spike occurs due to incomplete covering of the sensor electrodes present in the analysis wells. Also, since the potential is 0 V, no electrochemical reaction occurs during the filling up of the analysis wells. After the different analysis wells are completely filled, the meter provides the preprogrammed potential of 0.6 V to the working electrode of all the sensor electrodes. This result in the oxidation of glucose on the working electrode and a voltage proportional to the reaction current is made available to the microcontroller from each analog front end (AFE). From the electrochemical characterization of the LOC, it was observed that a sampling time of 12 seconds was required for the chronoamperogram to become stable. Hence the microcontroller was programmed to measure the voltage from the AFE's after a time interval of 12 seconds after application of 0.6 V. With the help of the calibration plot programmed into the microcontroller, the obtained voltage is converted to the corresponding glucose concentrations and the results are displayed on the graphical LCD screen. The test results obtained using the developed meter were compared for the ten electrodes and is shown in FIG. 15A for 3 mM glucose concentration and for 9 mM glucose concentration in FIG. 15B. It is seen that the variation of glucose concentration for plurality of electrodes was less than 3%.

Example 3: Determination of Concentration of Glucose in a Plurality of Samples

Materials and Instruments: An exemplary device according to the various embodiments of the invention as illustrated in FIG. 1 was prepared. The experiment was conducted with Glucose (Glucose, reagent), ascorbic acid (AA, reagent grade), dopamine (DA), uric acid (UA, 99.0% crystalline), acetamidophenol (AP, 98% analytical standard). Conducting inks of carbon, silver and Ag/AgCl were used for the preparation of electrodes. A silicone elastomer kit and Polydimethylsiloxane (PDMS) were mixed in the ratio of 10:1 prior to use. Negative photoresist and developer were used in the fabrication of microchannels. The experiment was carried out with a three electrode cell. In the case of screen printed electrodes AgCl ink printed electrode was used as the pseudo reference electrode. The modified electrodes were used as working electrodes and carbon as the counter electrode. Surface morphology of the modified electrodes was studied using atomic force microscope in non-contact mode. A direct laser write lithography instrument was used for patterning the negative photoresist. Blood serum samples were successfully tested and the results obtained were found to be close to the results of commercially available glucose sensor strips.

Synthesis of CuO nanoparticles: Considering the excellent electrocatalytic activity of CuO towards glucose oxidation, CuO based nano slurry was developed and was employed with screen printing technology for the fabrication of the glucose sensors. The mechanism of direct electrooxidation of glucose depends on the catalyst used. Cu based materials have shown better catalytic effect towards electrooxidation of glucose due to the redox couples mediated by $Cu(OH)_2/CuOOH$. CuO, being a p-type semiconductor, shows excellent electrochemical activity which led to its immense use in the development of gas and glucose sensors. The mechanism of oxidation of glucose on Cu and CuO modified electrodes involves the complete cleavage of C—C bonds resulting in greater sensitivity of the non-enzymatic sensors. CuO nanoparticles were synthesized by adding 26 ml of ammonia drop wise to 700 ml 0.05 M $CuSO_4$ under constant stirring till the solution turns to dark blue color. 150 ml of 1 M NaOH solution was added drop wise which resulted in the formation of a light blue colored precipitate of $[Cu(OH)_4]^{2-}$ as the pH reaches 14. This precipitate was filtered and washed with distilled water several times and calcined at 400° C. for 3 hours.

Design and development of screen printed electrodes: Screen printing technology was used for the fabrication of the sensor electrodes. The design for the different screens used for sequential printing is shown in FIG. 2. The working electrode of the three electrode system was designed with a 2 mm diameter working electrode placed between the counter and the reference electrodes. The working and the counter electrodes were placed at a distance of 0.5 mm apart. Since the fabrication of the screen printed electrodes requires sequential printing of silver, AgCl and carbon inks, three different designs were created. Polyethylene terephthalate (PET) sheets of 0.6 mm thickness were used as the substrate for screen printing. Prior to screen printing, the PET sheet was cleaned with acetone and was pre-heated at 90° C. for 12 hours. The first layer to be screen printed on the PET substrate was the silver conducting layer. The silver layer is then coated with conductive carbon ink to prevent it from oxidization. Ag/AgCl is then applied to the tip of the reference electrode. Thermal curing at 65° C. for 15 min was carried out after printing of each layer. For printing the working electrode, a catalytic ink formulation was developed by dispersing the CuO nanoparticles in a medical sensor grade conductive carbon ink. The optimized ink formulation which is prepared with 33% CuO nanoparticles in carbon ink was screen-printed onto the working electrode region and dried at 45° C. for 2 hours. The reduced temperature and slow drying process helped to avoid the formation of cracks on the printed region during drying.

Fabrication of microfluidic channels: The PDMS based microfluidic channels were fabricated by soft lithography. Initially, a glass substrate of 3 inches diameter was cleaned thoroughly in piranha solution (H2SO4 and H2O2 in the ratio 5:1) for 15 minutes and thoroughly washed with distilled water. The photoresist was spin coated at 1000 rpm for 100 s followed by a spread cycle of 1400 rpm for 10 s and prebaked at 120° C. for 30 minutes. After cooling, the pattern was exposed using a direct laser write pattern generator with an ultraviolet (UV) dose of 56 mW and energy intensity of 80%. Post exposure baking was carried out at 95° C. for 90 min followed by developing in developer solution for 7 minutes. The developer removed the areas that had not been exposed to UV, resulting in the formation of the negative (master) of the microstructure pattern. Silicon elastomer was used for the micro fabrication of the stamp. The silicon encapsulant contains two components, base and curing agent that were thoroughly mixed in the ratio 10:1 and dispensed over the master placed in a petri dish with the features facing upward. The air bubbles in the solution were removed by degassing using a vacuum pump. Following this, PDMS was cured at 100° C. for 35 minutes and peeled off from the surface of the master to obtain the PDMS stamp.

Figure 16:
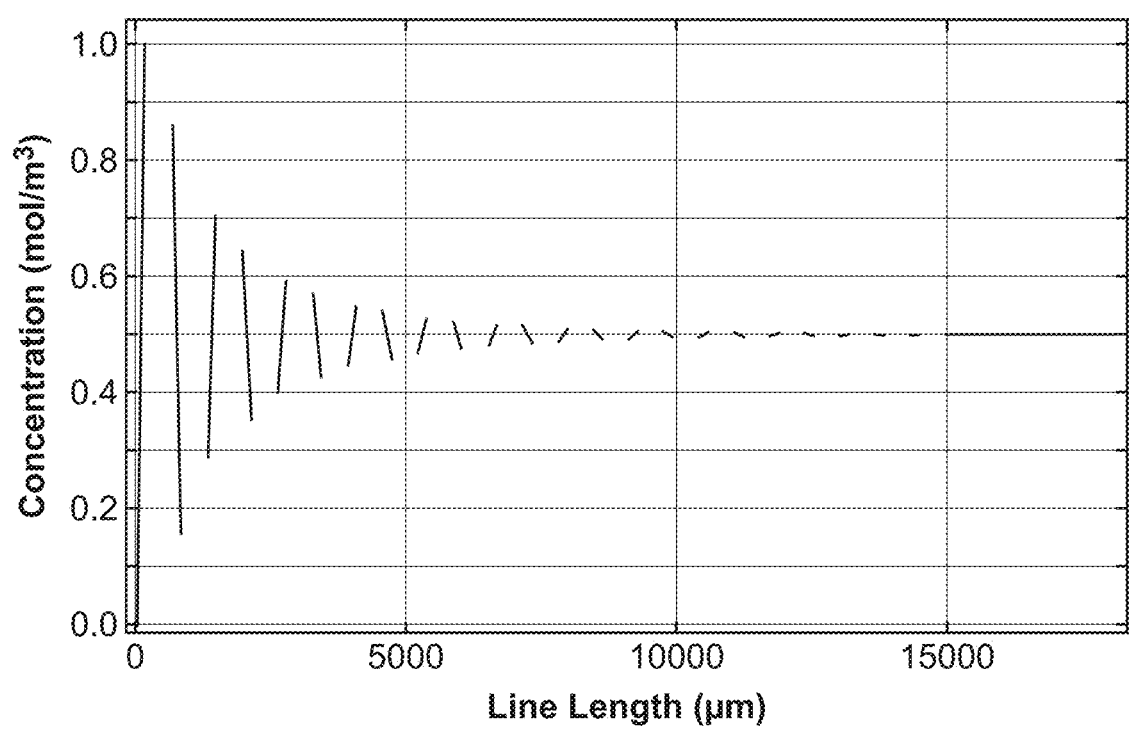
FIG. 16 illustrates the variation in concentration along the cut line through the meander channel.

Computational Fluid Dynamics (CFD) Simulation: To evaluate the mixing efficiency of the proposed design, computational simulation was carried out. The inlet was given an atmospheric pressure of 101325 Pa. No slip boundary condition was assumed along the walls of the microchannel. The outlet boundary condition was specified to be laminar outflow with a zero static pressure. Two model fluids, water in the analyte stream and ethanol in the reagent stream were fed in to the device for analysis. The model fluid system considered was assumed to have a low diffusivity value (1.2×10-9 m2 s−1). The Navier-Stokes equation was solved for obtaining the velocity profile through the microchannels while Fick's law of diffusion was used for studying mass transport within the microchannels. The concentration plot obtained for the mass transport between the two streams is shown in FIG. 16. A cut line was drawn from the first meander to the outlet of the channels to understand the variation of concentration along the microchannels. The variation in concentration along the cut line through the channel is represented in FIG. 16. The design was modeled in such a way that the primary inlet was assigned a concentration value of 0 (blue color) and the secondary channel had an initial concentration of 0 (red color). On the completion of mixing, a uniform green color was obtained at the outlet of the channel. From the simulation results, it is evident that the mixing is complete as the cross-sectional concentration at the outlet is uniform with a value of 0.5. The presence of meander channels leads to chaotic advections within the microchannel, which improves mixing efficiency.

Figure 17B:
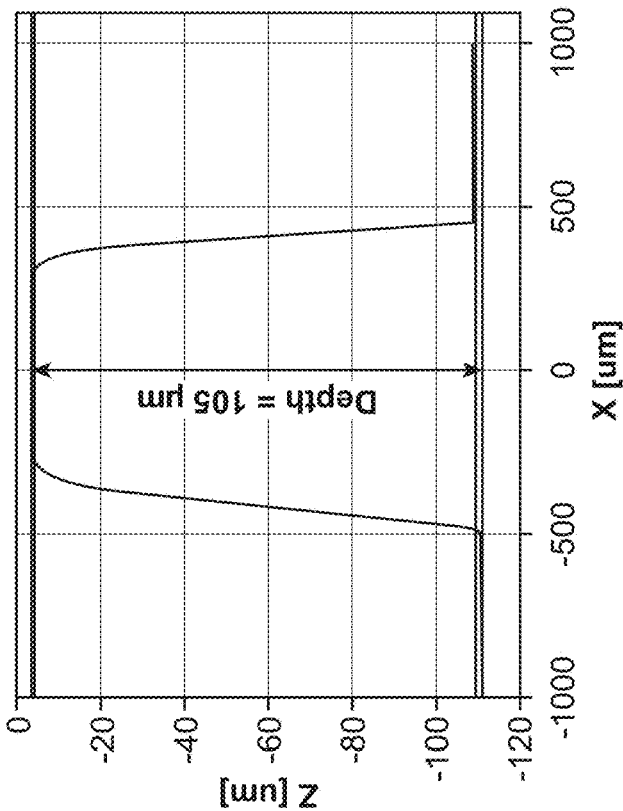
FIG. 17B shows the profilometer plot for the dimensions of the alternatively varying diameters in microchannels.
Figure 17A:
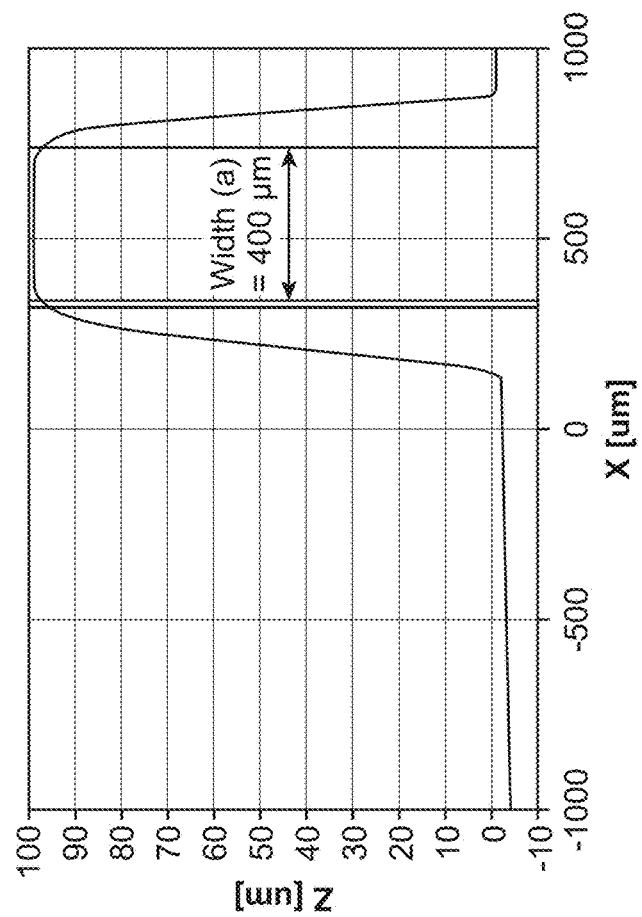
FIG. 17A illustrates the profilometer plot for the depth of the fabricated microchannels.
Figure 17C:
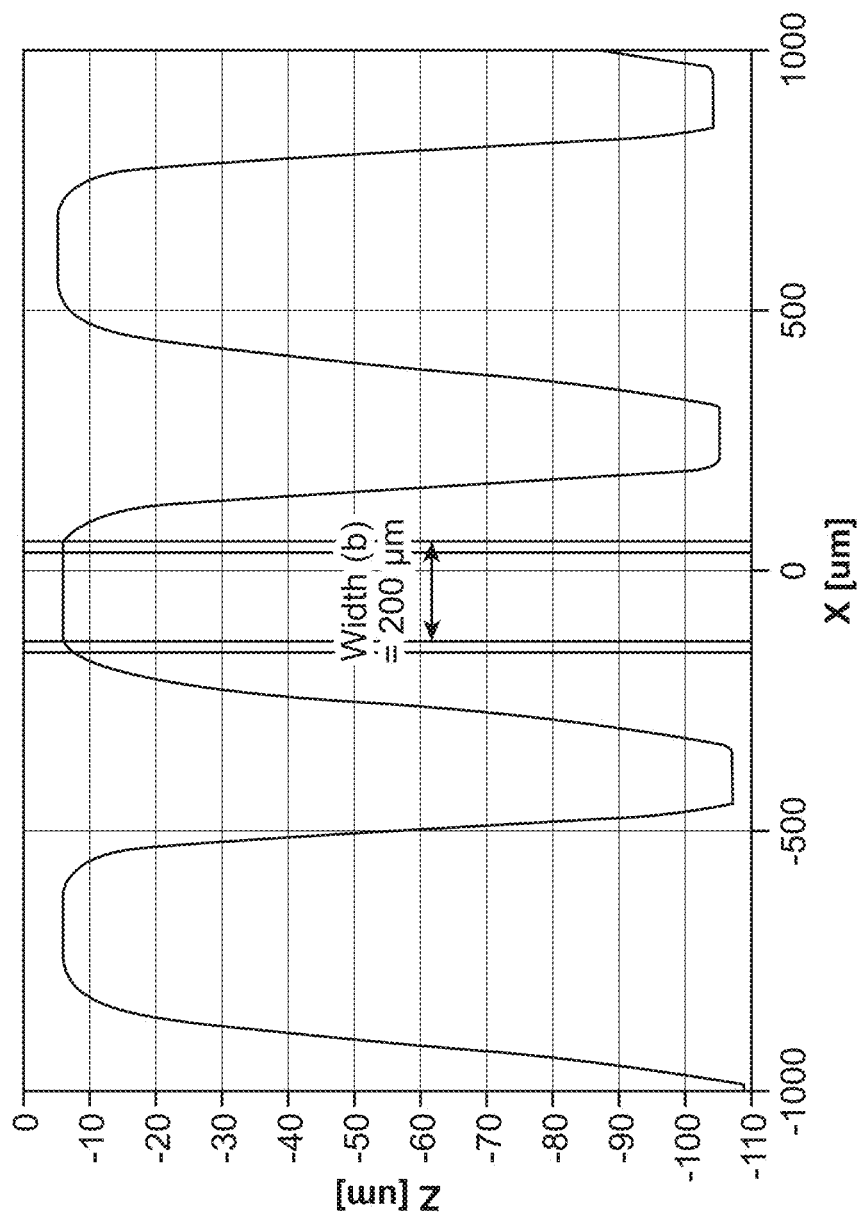
FIG. 17C shows the profilometer plot for the dimensions of the alternatively varying diameters in microchannels.

Study of fabricated microchannels using profilometer: The microfluidic channels were morphologically characterized using a profilometer and electrochemically characterized for its glucose sensing capabilities. Blood serum samples were successfully tested. The dimensions of the fabricated master were studied using profilometer. FIG. 17A shows the profilometer plots for the depth of the fabricated microchannels. It was evident that the fabricated micro channels have a depth of 110 µm. The dimensions of the alternatively varying diameters were also confirmed. FIG. 17B and FIG. 17C show that the dimensions of the micro channels were 200 µm in the X and 400 µm in the Y direction.

Electrochemical characterization of the LOC: FIG. 18A represents the linear sweep voltammograms recorded on the Lab-on-a-Chip with varying concentrations of glucose. The oxidation current increases linearly with glucose concentration up to 27 mM. There are two linear ranges, the first range is up to 15 mM with a linear regression equation (µA), Ip=195.1+32.67 C (mM) where regression coefficient, r=0.9944. The second range is from 15 mM to 27 mM with Ip=441.6+18.64 C (mM) where r=0.9919. A shift in peak potential is observed with increasing glucose concentration. This can be attributed to the slow kinetics of electrooxidation of glucose on the electrode surface. From the linear sweep voltammetry (LSV), it is found that the highest peak potential observed is 0.6 V. Hence all amperometric experiments were carried at an applied potential of 0.6 V. The mechanism of glucose oxidation on copper electrode in alkaline medium shows that CuO is responsible for the direct electrooxidation of glucose through six catalytic cycles each involving two-electron transfers leading to the formation of formic acid. The formation of Cu (II)/Cu (III) states and the oxidation peak of glucose occur at around +0.40 to +0.80 V. Hence the Cu (III) species is acting as a mediator for the electrocatalytic oxidation of glucose. This is distinctly different from that of chemical and biochemical glucose oxidation that involves gluconic acid intermediate formation. [0089] The results of chronoamperometric experiments carried out at 0.6 V is shown in FIG. 18B. The steady current response was recorded for 20 seconds. From the graph, it is observed that current decays with time obeying Cottrell equation, which describes the change in electric current with respect to time in a controlled potential experiment. It is also observed that the current decreases and becomes stable at around 12 seconds and hence the sampling time was fixed as 12 seconds. FIG. 18B shows two linear ranges of current response with concentration. For glucose concentration up to 15 mM, the linear regression equation is Ip (µA)=34.82+19.02 C (mM) with regression coefficient, r=0.9979. The other linear range is from 15 mM to 27 mM with Ip=261.4+32.5 C (mM) with r=0.9905.

Figure 18D:
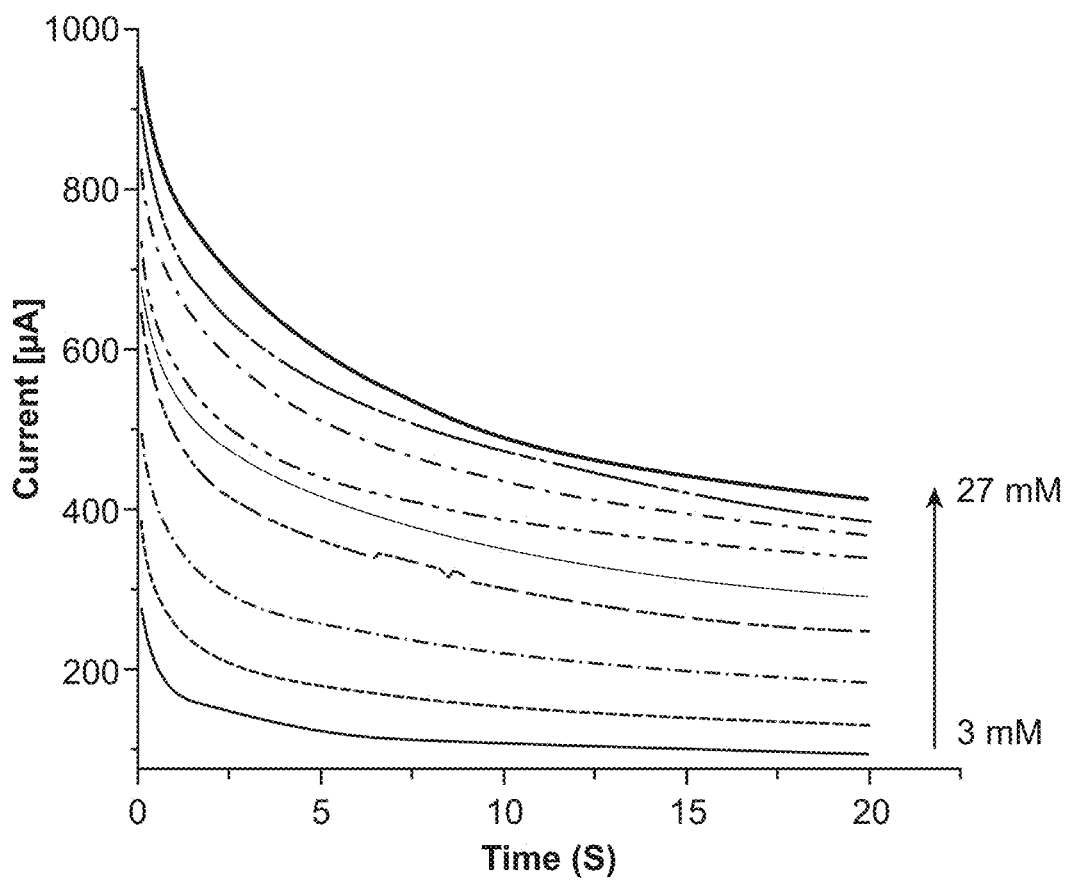
FIG. 18D illustrates the electrochemical response on ten different electrodes for 9 mM glucose concentration.
Figure 18E:
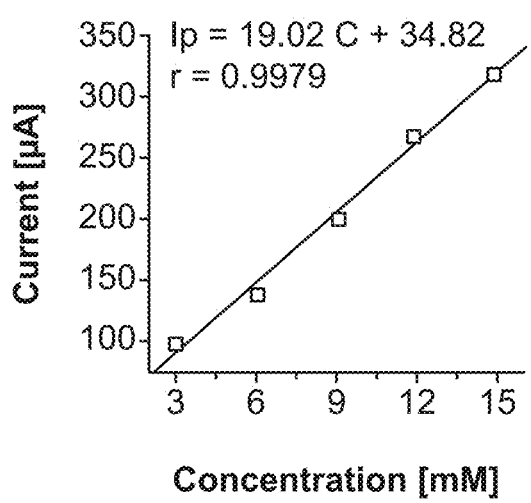
FIG. 18E shows the glucose concentration in five samples.
Figure 18F:
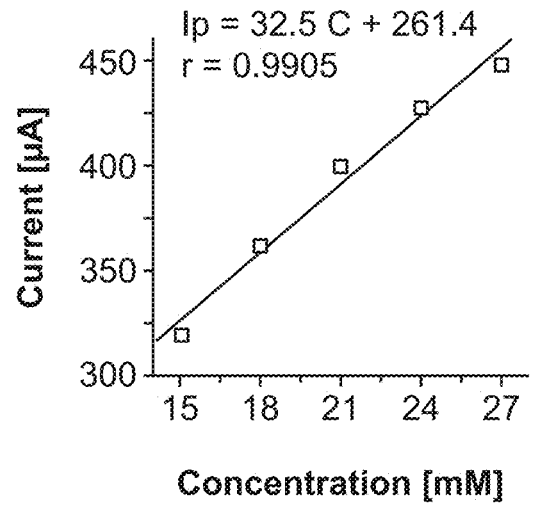
FIG. 18F shows the glucose concentration Vs current plot for five samples.
Figure 19B:
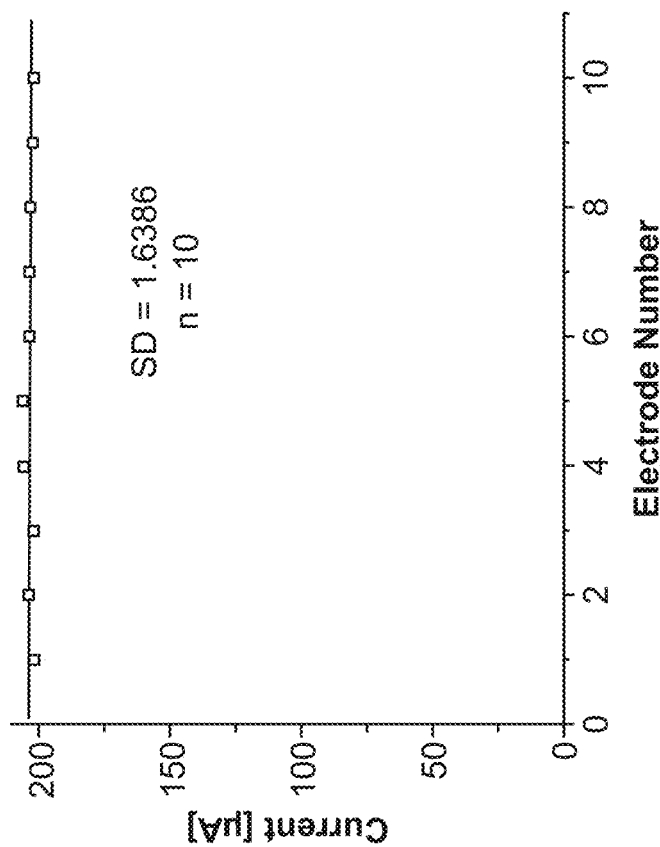
FIG. 19B illustrates the response current obtained from various chips in the potentiostatic meter.
Figure 19A:
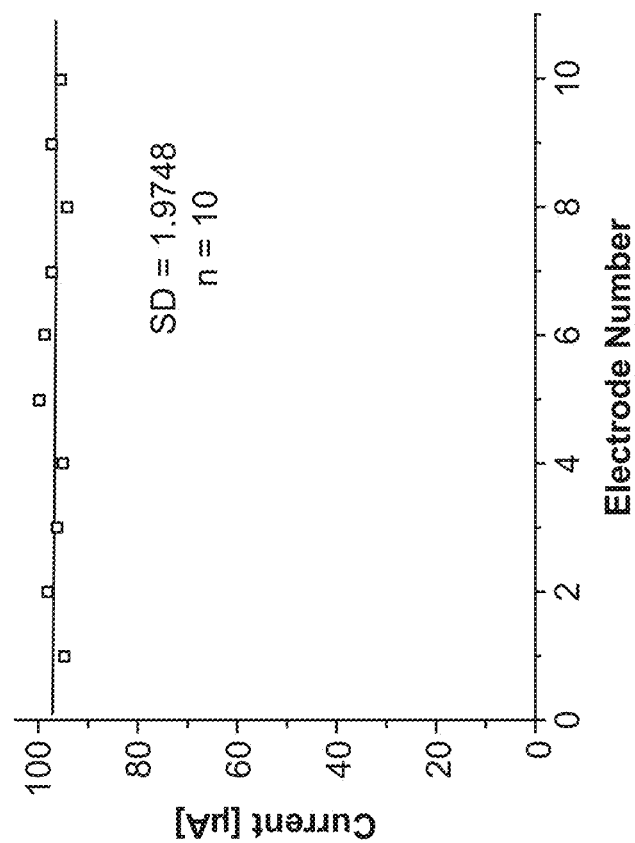
FIG. 19A illustrates the response current obtained from various chips in the potentiostatic meter.

Reproducibility, repeatability and storage stability of the LOC: The developed LOC is intended for but not limited to community screening of blood glucose. It is essential that the fabrication process be highly reproducible. For this purpose, LOCs were fabricated and the chronoamperometric response of these sensors towards 3 mM and 9 mM of glucose at 0.6 V was compared. FIG. 18A shows the electrochemical response for 3 mM glucose concentration on ten different electrodes. FIG. 18D shows the electrochemical response for 9 mM glucose concentration on ten different electrodes. The response current as shown in FIG. 19A and FIG. 19B are obtained from the various chips and the variation was found to be less than 4%. This confirmed that the process used for the fabrication of the disposable strips is highly reproducible. An important criterion for the commercial viability of the LOC is their storage condition and shelf life. Sensors with minimum storage restrictions and prolonged shelf life are highly desired. In order to understand these two characteristics of the LOC, numerous electrodes were fabricated and evaluated over a period of 4 months for their repeatability and reproducibility by testing them chronoamperometrically at +0.60 V with 9 mM of glucose. From the tests conducted, a variation of less than ±3% was observed over the entire testing period.

Blood serum sample analysis in LOC: As the Lab-on-a chip device in intended for mass screening of patient samples, it is highly essential to validate the performance of the sensor with real samples. So, chronoamperometry was carried out with serum obtained from two volunteers which were mixed and tested at +0.60V. From Table 1 it is evident that the results obtained from the fabricated sensor are in line with the commercially available strips. Moreover, Table 1 also highlights the very high recovery rate of the CuO based glucose sensor along with acceptable relative standard deviation (RSD) values that fall within 3 to 10%.

What is claimed is:

1. A microfluidic array device for determining the concentration of one or more analytes, comprising:
   a plurality of assembled units, each unit comprising
      a sample well configured to receive a sample;
      a reagent well configured to receive a reagent;
      a mixing well configured to receive the sample from the sample well and reagent from the reagent well and form a mixture;
      a meander channel comprising a plurality of meanders having alternatively varying diameters and configured to receive the mixture from the mixing well and enhance the mixing of the mixture, thereby forming a uniform solution; and
      a sensor chamber in fluidic contact with a sensor unit configured to receive the uniform solution from the meander channel, wherein the sensor unit generates an output indicative of the one or more analyte concentration in the sample;
   wherein the device is fabricated in a plurality of layers, the plurality of layers comprising
      a first layer housing the plurality of assembled units;
      a third layer comprising the sensor unit printed on a substrate; and
      a second layer sandwiched between the two layers, the second layer comprising a plurality of holes to fit the sensor unit, thereby allowing fluidic contact between the sensor unit and the sensor chamber.

2. The device of claim 1, wherein the sensor chamber of the plurality of assembled units are connected to a common outlet mounted with a syringe or a pump to supply negative pressure thereon.

3. The device of claim 1, wherein the first layer and the second layer are made of polydimethylsiloxane (PDMS).

4. The device of claim 1, wherein the substrate is selected from polyethylene terephthalate, polycarbonate, polyethylene, polypropylene, polyvinyl chloride, polyamide, polymethyl methacrylate, and polysulfone.

5. The device of claim 1, wherein the sensor unit is a non-enzymatic electrochemical sensor.

6. The device of claim 1, wherein the device is configured to simultaneously determine the concentration of analytes selected from glucose, cholesterol, creatinine, uric acid, and bilirubin.

7. The device of claim 1, wherein the meander channel has alternately varying first diameter in the range of 150 µm to 250 µm and second diameter in the range of 350 µm to 450 µm, and a depth in the range of 100 µm to 120 µm.

8. A method of determining one or more analyte concentration in a sample, comprising:
   loading the sample in an array device of claim 1; and
   assaying the sample to determine one or more analyte concentration in the sample.

9. The device of claim 1, wherein the sensor chambers are integrated with a potentiostatic meter module, the module comprising:
   a plurality of analog front ends, wherein each of the analog front ends are connected to the corresponding sensor units;
   a microcontroller connected to each of the analog front ends and configured to interface with the sensor units and convert the outputs into chemical concentrations of the sample; and
   an output unit, configured to transmit the chemical concentrations.

10. The device of claim 9, wherein the output unit comprises a graphical LCD display unit or a Bluetooth enabled device using a Bluetooth module.

11. A microfluidic array device for determining the concentration of one or more analytes, comprising:
    a plurality of assembled units, each unit comprising
       a sample well configured to receive a sample;
       a reagent well configured to receive a reagent;
       a mixing well configured to receive the sample from the sample well and reagent from the reagent well and form a mixture;
       a meander channel comprising a plurality of meanders having alternatively varying diameters and configured to receive the mixture from the mixing well and enhance the mixing of the mixture, thereby forming a uniform solution; and
    a sensor chamber in fluidic contact with a sensor unit configured to receive the uniform solution from the meander channel, wherein the sensor unit generates an output indicative of the one or more analyte concentration in the sample; wherein each unit further comprises a microchannel connecting the reagent well to the sample well at an inlet of the mixing well configured as a T-inlet.

12. A method of determining one or more analyte concentration in a sample, comprising:
    loading the sample in an array device of claim 11; and
    assaying the sample to determine one or more analyte concentration in the sample.

13. A microfluidic array device for determining the concentration of one or more analytes, comprising:
    a plurality of assembled units, each unit comprising
       a sample well configured to receive a sample;
       a reagent well configured to receive a reagent;
       a mixing well configured to receive the sample from the sample well and reagent from the reagent well and form a mixture;
       a meander channel comprising a plurality of meanders having alternatively varying diameters and configured to receive the mixture from the mixing well and enhance the mixing of the mixture, thereby forming a uniform solution; and
    a sensor chamber in fluidic contact with a sensor unit configured to receive the uniform solution from the meander channel, wherein the sensor unit generates an output indicative of the one or more analyte concentration in the sample;
    wherein the sensor unit comprises: a three-electrode system comprising at least one working electrode, a carbon counter electrode and a reference electrode; and
    wherein the working electrode is modified with a CuO nanoparticle coating to determine glucose concentration, the working electrode is an activated screen printed carbon electrode to determine uric acid concentration, the working electrode is a screen printed carbon electrode to determine creatinine concentration, or the working electrode is a pencil graphite electrode to determine cholesterol concentration.

14. The device of claim 13, wherein the working electrode is modified with a CuO nanoparticle coating to determine glucose concentration.

15. The device of claim 13, wherein the working electrode is an activated screen printed carbon electrode to determine uric acid concentration.

16. The device of claim 13, wherein the working electrode is a screen printed carbon electrode to determine creatinine concentration.

17. The device of claim 13, wherein the working electrode is a screen printed carbon electrode printed with copper nanoparticles to determine bilirubin concentration.

18. The device of claim 13, wherein the working electrode is a pencil graphite electrode to determine cholesterol concentration.

19. A method of determining one or more analyte concentration in a sample, comprising:
loading the sample in an array device of claim 13; and
assaying the sample to determine one or more analyte concentration in the sample.

20. A microfluidic array device for determining the concentration of one or more analytes, comprising:
a plurality of assembled units, each unit comprising
a sample well configured to receive a sample;
a reagent well configured to receive a reagent;
a mixing well configured to receive the sample from the sample well and reagent from the reagent well and form a mixture;
a meander channel comprising a plurality of meanders having alternatively varying diameters and configured to receive the mixture from the mixing well and enhance the mixing of the mixture, thereby forming a uniform solution; and
a sensor chamber in fluidic contact with a sensor unit configured to receive the uniform solution from the meander channel, wherein the sensor unit generates an output indicative of the one or more analyte concentration in the sample;
wherein the generated output is a voltage indicative of the analyte concentration in the sample.

21. A method of determining one or more analyte concentration in a sample, comprising:
loading the sample in an array device of claim 20; and
assaying the sample to determine one or more analyte concentration in the sample.

* * * * *